(12) United States Patent
Yang

(10) Patent No.: US 10,509,200 B2
(45) Date of Patent: Dec. 17, 2019

(54) PHOTOGRAPHING LENS ASSEMBLY, IMAGE CAPTURING UNIT AND ELECTRONIC DEVICE

(71) Applicant: LARGAN PRECISION CO., LTD., Taichung (TW)

(72) Inventor: Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 70 days.

(21) Appl. No.: 15/863,916

(22) Filed: Jan. 6, 2018

(65) Prior Publication Data
US 2019/0056565 A1  Feb. 21, 2019

(30) Foreign Application Priority Data
Aug. 18, 2017  (TW) .............................. 106128137 A

(51) Int. Cl.
| | | |
|---|---|---|
| *G02B 13/00* | (2006.01) | |
| *G02B 13/18* | (2006.01) | |
| *G02B 3/02* | (2006.01) | |
| *G02B 3/04* | (2006.01) | |
| *G02B 27/00* | (2006.01) | |
| *G02B 27/64* | (2006.01) | |
| *G02B 9/60* | (2006.01) | |
| *G02B 9/62* | (2006.01) | |
| *G02B 9/64* | (2006.01) | |
| *G02B 9/34* | (2006.01) | |

(52) U.S. Cl.
CPC ............. *G02B 13/002* (2013.01); *G02B 3/02* (2013.01); *G02B 3/04* (2013.01); *G02B 9/34* (2013.01); *G02B 9/60* (2013.01); *G02B 9/62* (2013.01); *G02B 9/64* (2013.01); *G02B 13/004* (2013.01); *G02B 13/0035* (2013.01); *G02B 13/0045* (2013.01); *G02B 13/18* (2013.01); *G02B 27/0025* (2013.01); *G02B 27/646* (2013.01)

(58) Field of Classification Search
CPC .................. G02B 3/04; G02B 9/00–64; G02B 13/002–0045; G02B 13/18
USPC .................................................. 359/708–718
See application file for complete search history.

(56) References Cited

U.S. PATENT DOCUMENTS

| | | |
|---|---|---|
| 3,778,133 A | 12/1973 | Tatian |
| 4,682,862 A | 7/1987 | Moskovich |
| 4,792,217 A | 12/1988 | Yoshioka |
| 4,810,075 A | 3/1989 | Fukuda |

(Continued)

FOREIGN PATENT DOCUMENTS

| | | |
|---|---|---|
| JP | H02-111909 A | 4/1990 |
| JP | H02-190810 A | 7/1990 |

(Continued)

OTHER PUBLICATIONS

TW Office Action dated Mar. 9, 2018 in application No. 106128137.

*Primary Examiner* — Nicholas R. Pasko
(74) *Attorney, Agent, or Firm* — Maschoff Brennan

(57) ABSTRACT

A photographing lens assembly includes, in order from an object side to an image side: a plurality of lens elements and an aspheric image surface. Each of the lens elements of the photographing lens assembly has an object-side surface facing toward the object side and an image-side surface facing toward the image side, and each of the lens elements is a single and non-cemented lens element.

28 Claims, 26 Drawing Sheets

(56) References Cited

U.S. PATENT DOCUMENTS

| | | | |
|---|---|---|---|
| 4,824,224 A | 4/1989 | Fukuda et al. | |
| 4,933,599 A | 6/1990 | Fukuda | |
| 4,993,817 A | 2/1991 | Hoogland | |
| 6,122,009 A * | 9/2000 | Ueda | H01L 27/14618 348/335 |
| 6,618,093 B1 * | 9/2003 | Levy | H04N 5/2253 348/374 |
| 8,842,376 B2 * | 9/2014 | Yang | G02B 7/022 359/741 |
| 9,086,558 B2 * | 7/2015 | Chen | H01L 27/14607 |
| 9,104,018 B2 * | 8/2015 | Ishihara | G02B 13/18 |
| 9,244,253 B2 | 1/2016 | Chen et al. | |
| 9,453,986 B2 * | 9/2016 | Ishihara | G02B 13/18 |
| 9,551,856 B2 | 1/2017 | Gabriel et al. | |
| 9,560,298 B2 | 1/2017 | Lewkow et al. | |
| 2013/0063634 A1 * | 3/2013 | Yamano | G02B 13/0035 348/294 |
| 2014/0301728 A1 | 10/2014 | Guenter et al. | |
| 2014/0376113 A1 | 12/2014 | Guenter et al. | |
| 2015/0029369 A1 | 1/2015 | Nagata et al. | |
| 2015/0061064 A1 * | 3/2015 | Baba | G02B 13/002 257/432 |
| 2015/0358516 A1 * | 12/2015 | Baba | G02B 13/004 348/360 |
| 2018/0045921 A1 * | 2/2018 | Kumazawa | G02B 13/0045 |

FOREIGN PATENT DOCUMENTS

| | | |
|---|---|---|
| JP | H03-67210 A | 3/1991 |
| JP | H03-95512 A | 4/1991 |
| JP | 2013-025202 A | 2/2013 |
| JP | 2015-022152 A | 2/2015 |
| JP | 2016-114693 A | 6/2016 |
| TW | 201346324 A | 11/2013 |
| WO | WO-2016178260 A1 * | 11/2016 ............... G02B 9/60 |

* cited by examiner

PHOTOGRAPHING LENS ASSEMBLY, IMAGE CAPTURING UNIT AND ELECTRONIC DEVICE

RELATED APPLICATIONS

This application claims priority to Taiwan Application 106128137, filed on Aug. 18, 2017, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

In recent years, with the development and popularity of camera modules, the product specifications are becoming more diverse and stringent for various applications. As advanced semiconductor manufacturing technologies have reduced the pixel size of sensors, and compact optical systems have gradually evolved toward the field of higher megapixels, there is an increasing demand for compact optical systems featuring better image quality.

For various applications, the optical systems have been widely applied to different kinds of electronic devices, such as intelligent electronic devices, multiple lens devices, wearable devices, digital cameras, image recognition systems, network surveillance devices, vehicle cameras and intelligent home systems. In particular, portable electronic devices equipped with the optical systems are now more demanding than ever.

In general, a conventional camera is usually designed with a planar image sensor, which leads to inevitable physical problems causing insufficient brightness and poor sharpness at the periphery of the image, such that there would be aberrations, such as chromatic aberration and distortion, created in received images, thereby degrading image resolution and image quality. Furthermore, since the image sensor is designed planar, the optical systems are required to have sufficient back focal length so as to focus all incident light rays from imaged object onto the image sensor. Therefore, the camera would be large in size, failing to achieve compactness. Accordingly, there is a need to develop a miniaturized optical system featuring high sensibility, high image resolution and high image quality.

SUMMARY

According to one aspect of the present disclosure, a photographing lens assembly includes, in order from an object side to an image side, a plurality of lens elements and an image surface. Each of the plurality of lens elements has an object-side surface facing toward the object side and an image-side surface facing toward the image side. Each of the plurality of lens elements is a single and non-cemented lens element. When a sum of axial distances between every adjacent lens elements of the photographing lens assembly is $\Sigma AT$, a sum of central thicknesses of the plurality of lens elements of the photographing lens assembly is $\Sigma CT$, a displacement in parallel with an optical axis between a profile point on the image surface and an axial vertex of the image surface is X, a vertical distance between the profile point on the image surface and the optical axis is Y, a conic coefficient of the image surface is k, a curvature radius of the image surface at the profile point is R, and an i-th aspheric coefficient of the image surface is Ai, the following conditions are satisfied:

$$0.10 < \Sigma AT/\Sigma CT < 3.50;$$

$$X = (Y^2/R)/\{1 + \text{sqrt}[1-(1+k)\times(Y/R)^2]\} + \Sigma(Ai)\times(Y^i); \text{ and}$$

$$0 < |k| + \Sigma |Ai|.$$

According to another aspect of the present disclosure, an image capturing unit includes the aforementioned photographing lens assembly and an image sensor, wherein the image sensor is disposed on the image surface of the photographing lens assembly. The image sensor has an aspheric surface facing toward the image surface.

According to still another aspect of the present disclosure, an electronic device includes the aforementioned image capturing unit.

According to yet another aspect of the present disclosure, an image capturing unit includes, in order from an object side to an image side, a photographing lens assembly and an aspheric image sensor. The photographing lens assembly includes, in order from the object side to the image side, a plurality of lens elements and an aspheric image surface. Each of the plurality of lens elements has an object-side surface facing toward the object side and an image-side surface facing toward the image side. The aspheric image sensor is disposed on the aspheric image surface, and a curvature of a surface of the aspheric image sensor varying in an effective photosensitive area thereof. When a maximum value among all central thicknesses of the plurality of lens elements of the photographing lens assembly is CTmax, and a minimum value among all central thicknesses of the plurality of lens elements of the photographing lens assembly is CTmin, the following conditions are satisfied:

$$CT\text{max} < 2.0 \text{ [mm]; and}$$

$$CT\text{min} < 0.50 \text{ [mm]}.$$

According to yet still another aspect of the present disclosure, an image capturing unit includes, in order from an object side to an image side, a photographing lens assembly and an aspheric image sensor. The photographing lens assembly includes, in order from the object side to the image side, a plurality of lens elements and an aspheric image surface. Each of the plurality of lens elements has an object-side surface facing toward the object side and an image-side surface facing toward the image side. Two of the plurality of lens elements closest to the object side, in order from the object side to the image side, respectively have refractive power and negative refractive power. The aspheric image sensor is disposed on the aspheric image surface, and a curvature of a surface of the aspheric image sensor varying in an effective photosensitive area thereof. The plurality of lens elements includes an object-side lens element closest to the object side. When an axial distance between the object-side surface of the object-side lens element and the aspheric image surface is TL, the following condition is satisfied:

$$TL < 20 \text{ [mm]}.$$

BRIEF DESCRIPTION OF THE DRAWINGS

The disclosure can be better understood by reading the following detailed description of the embodiments, with reference made to the accompanying drawings as follows.

DETAILED DESCRIPTION

An image capturing unit includes, in order from an object side to an image side, a photographing lens assembly and an image sensor. The photographing lens assembly includes, in order from the object side to the image side, a plurality of lens elements and an image surface, wherein the image surface is aspheric. The lens elements of the photographing lens assembly include an object-side lens element closest to the object side and an image-side lens element closest to the image surface. The image sensor is an aspheric image sensor disposed on or near the image surface, and a curvature of a surface of the image sensor varying in an effective photosensitive area thereof; that is, a curvature radius on the surface of the image sensor varies from a paraxial region thereof to an off-axis region thereof.

Figure 23:
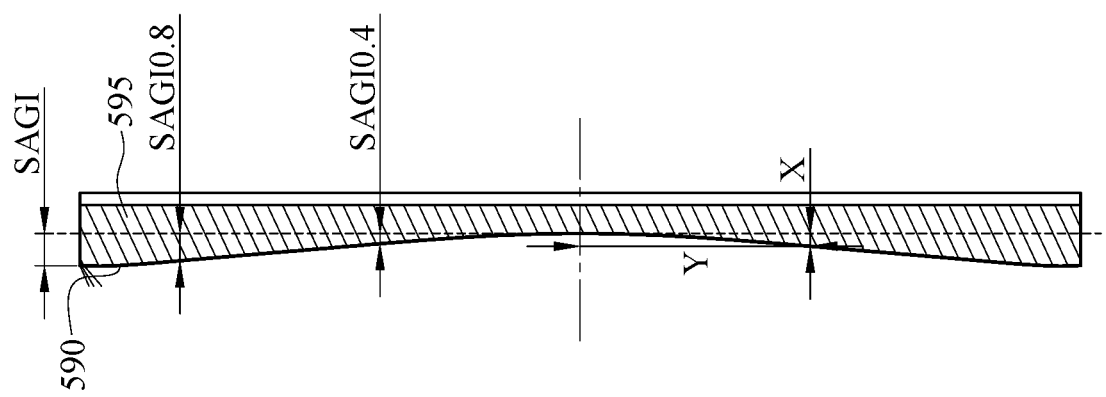
FIG. 23 shows a schematic view of X, Y, SAGI, SAGI0.8 and SAGI0.4 according to the 5th embodiment of the present disclosure.

The equation of the aspheric surface profiles of the aforementioned image surface is expressed as follows: $X=(Y^2/R)/\{1+\text{sqrt}[1-(1+k)\times(Y/R)^2]\}+\Sigma(Ai)\times(Y^i)$, wherein $0<|k|+\Sigma|Ai|$, X is a displacement in parallel with an optical axis between a profile point on the image surface and an axial vertex of the image surface, Y is a vertical distance between the profile point on the image surface and the optical axis, k is a conic coefficient of the image surface, R is a curvature radius of the image surface at the profile point, and Ai is an i-th aspheric coefficient of the image surface. Therefore, ergonomically designed image surface with curved surface shape (i.e. resembling the shape of an eyeball) is favorable for increasing image brightness at the periphery of the image and improving the image quality; furthermore, it is favorable for reducing the size of the photographing lens assembly to achieve compactness. Please refer to FIG. 23, which shows a schematic view of X and Y according to the 5th embodiment of the present disclosure.

There can be an air gap in a paraxial region between every adjacent lens elements of the photographing lens assembly; that is, each of the lens elements can be a single and non-cemented lens element. The manufacturing process of the cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to displacement and it is thereby not favorable for the image quality. Therefore, having an air gap in a paraxial region between every adjacent lens elements of the photographing lens assembly in the present disclosure is favorable for obtaining a proper space arrangement of the photographing lens assembly, and broadening the design flexibility of the lens elements, such that it is beneficial for correcting aberrations.

When a sum of axial distances between every adjacent lens elements of the photographing lens assembly is $\Sigma AT$, and a sum of central thicknesses of the lens elements of the photographing lens assembly is $\Sigma CT$, the following condition can be satisfied: $0.10<\Sigma AT/\Sigma CT<3.50$. Therefore, it is favorable for properly arranging the lens elements of the photographing lens assembly so as to increase assembling yield rate and reduce the sensitivity.

When a maximum value among all central thicknesses of the lens elements of the photographing lens assembly is CTmax, the following condition can be satisfied: CTmax<2.0 [mm]. Therefore, a proper arrangement of central thickness for the lens elements is favorable for reducing the sensitivity and reducing a total track length of the photographing lens assembly. Preferably, the following condition can also be satisfied: CTmax<1.50 [mm].

When a minimum value among all central thicknesses of the lens elements of the photographing lens assembly is CTmin, the following condition can be satisfied: CTmin<0.50 [mm]. Therefore, a proper arrangement of central thickness for the lens elements is favorable for reducing the sensitivity and reducing the total track length of the photographing lens assembly. Preferably, the following condition can also be satisfied: CTmin<0.40 [mm].

When an axial distance between an object-side surface of the object-side lens element and the image surface is TL, the following condition can be satisfied: TL<20 [mm]. Therefore, a proper total track length is favorable for the photographing lens assembly to be compact in size so as to be applicable to various devices. Preferably, the following condition can be satisfied: TL<15 [mm]. More preferably, the following condition can be satisfied: TL<9.5 [mm]. Much more preferably, the following condition can also be satisfied: TL<7.0 [mm]. According to the present disclosure, the image surface can be concave in a paraxial region thereof and face toward the object side, and the image surface can have at least one convex shape in an off-axis region thereof. Therefore, adjusting a shape of the image surface to coincide with the Petzval Surface is favorable for correcting field curvature so as to increase image sharpness; furthermore, it is favorable for correcting off-axis aberrations so as to further improve the image quality.

According to the present disclosure, the lens elements of the photographing lens assembly include two lens elements closest to the object side; that is, there are two lens elements which are closer to the object side than the other lens elements. These two lens elements, in order from the object side to the image side, can have positive refractive power and negative refractive power, respectively. Therefore, it is favorable for balancing the refractive power on the object side of the photographing lens assembly so as to reduce the sensitivity and correct aberrations, thereby maintaining high image quality.

When a displacement in parallel with the optical axis from the axial vertex of the image surface to a maximum image height position on the image surface is SAGI, and a focal length of the photographing lens assembly is f, the following condition can be satisfied: 0.03<|(10×SAGI)/f|<1.4. Therefore, adjusting the shape of the image surface to correct off-axis aberrations under various shooting conditions (e.g., different distances from imaged objects and different background brightness) is favorable for improving the image quality and increasing illuminance on the periphery of the image surface, thereby increasing image resolution. Preferably, the following condition can also be satisfied: 0.07<|(10×SAGI)/f|<0.80. Please refer to FIG. 23, which shows a schematic view of SAGI according to the 5th embodiment of the present disclosure. When the direction from the axial vertex of the image surface to the maximum image height position on the image surface is facing towards the image side of the photographing lens assembly, the value of SAGI is positive; when the direction from the axial vertex of the image surface to the maximum image height position on the image surface is facing towards the object side of the photographing lens assembly, the value of SAGI is negative.

When a displacement in parallel with the optical axis from the axial vertex of the image surface to a position of 0.8 times the maximum image height on the image surface is SAGI0.8, and a displacement in parallel with the optical axis from the axial vertex of the image surface to a position of 0.4 times the maximum image height on the image surface is SAGI0.4, the following condition can be satisfied: 0<|SAGI0.8/SAGI0.4|<5.0. Therefore, a proper shape at the periphery of the image surface is favorable for correcting aberrations in different positions of the image surface, and thereby obtaining compact images so as to meet various requirements. Preferably, the following condition can also be satisfied: 1.20<|SAGI0.8/SAGI0.4|<4.0. Please refer to FIG. 23, which shows a schematic view of SAGI0.8 and SAGI0.4 according to the 5th embodiment of the present disclosure.

When the focal length of the photographing lens assembly is f, and a curvature radius of the image surface in a paraxial region thereof is Ri, the following condition can be satisfied: 0.01<|f/Ri|<0.50. Therefore, a proper curvature radius of the image surface is favorable for increasing the manufacturing yield rate of the aspheric image sensor working with the image surface, and also favorable for correcting aberrations on the image side of the photographing lens assembly so as to maintain high image quality. Preferably, the following condition can also be satisfied: 0.03<|f/Ri|<0.20.

Figure 24:
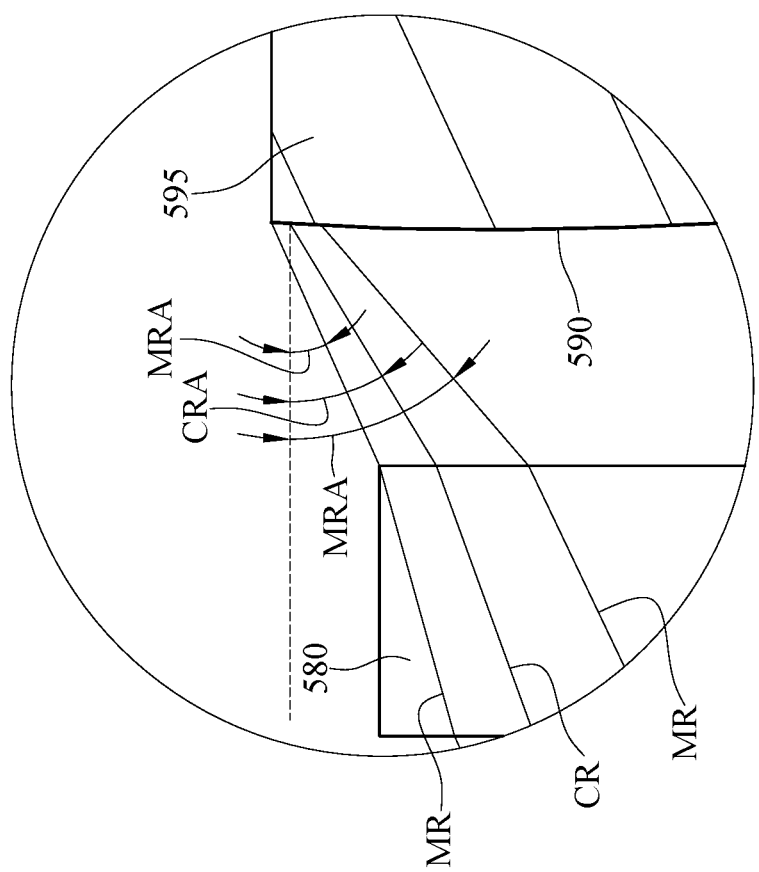
FIG. 24 shows a schematic view of CRA and MRA according to the 5th embodiment of the present disclosure.

When a vertical distance between a point at the maximum image height position on the image surface in which a chief ray is incident and the optical axis is CRH, and a vertical distance between a point at the maximum image height position on the image surface in which a marginal ray on a meridional plane is incident and the optical axis is MRH, the following condition can be satisfied: |(CRH−MRH)×10|<0.50 [mm]. Therefore, constraining the position where the chief ray and the meridional marginal rays are incident in the maximum image height position on the image surface to prevent light rays from diverging is favorable for increasing image sharpness and thereby improving the image quality. Preferably, the following condition can also be satisfied: |(CRH−MRH)×10|<0.30 [mm]. Please refer to FIG. 24, which shows a chief ray CR incident in the maximum image height position on the image surface, and two meridional marginal rays MR incident in the maximum image height position on the image surface, according to the 5th embodiment of the present disclosure.

When an angle between the chief ray at the maximum image height position on the image surface and a normal line of the image surface in a paraxial region thereof is CRA, and an angle between the marginal ray on the meridional plane at the maximum image height position on the image surface and the normal line of the image surface in the paraxial region thereof is MRA, the following condition can be satisfied: 0.01<|(CRA−MRA)/CRA|<0.80. Therefore, proper incidences of the chief ray and the meridional marginal rays on the image surface in the maximum image height position are favorable for obtaining a balance among image brightness, image quality and miniaturization. Preferably, the following condition can also be satisfied: 0.05<|(CRA−MRA)/CRA|<0.50. Please refer to FIG. 24, which shows a schematic view of CRA and MRA according to the 5th embodiment of the present disclosure, wherein the normal line of the image surface in the paraxial region thereof is parallel to the optical axis.

When half of a maximum field of view of the photographing lens assembly is HFOV, the following condition can be satisfied: 0.65<tan(HFOV)<1.80. Therefore, it is favorable for obtaining a proper field of view so as to meet the requirements of compactness and sufficient field of view, and thereby the photographing lens assembly is applicable to a wide range of miniaturized devices. Preferably, the following condition can also be satisfied: 0.75<tan(HFOV)<1.40.

When an f-number of the photographing lens assembly is Fno, the following condition can be satisfied: 1.0<Fno<2.20. Therefore, it is favorable for providing sufficient amount of incident light to increase illuminance on the image surface, so that the imaging capturing unit including the photographing lens assembly is able to capture enough image information in a low light condition (e.g., in the night) or short exposure photography (e.g., dynamic photography), and thus an electronic device equipped with the imaging capturing unit can generate high quality image after image processing. As a result, the electronic device is able to work under various conditions. Preferably, the following condition can also be satisfied: 1.20<Fno<1.90.

When a distortion in the maximum image height position of the photographing lens assembly is DIST, the following condition can be satisfied: |DIST|<2.5%. Therefore, it is favorable for constraining the optical distortion of the photographing lens assembly so as to prevent distortion and deformation at the periphery of the image, thereby improving the image quality.

When a curvature radius of the object-side surface of the object-side lens element is R1, and a curvature radius of an image-side surface of the object-side lens element is R2, the following condition can be satisfied: −3.50<(R1+R2)/(R1−R2)<0. Therefore, adjusting a shape of a specific lens element of the photographing lens assembly is favorable for obtaining a miniaturized configuration, controlling the total track length, and providing high image quality.

When a curvature radius of an object-side surface of the image-side lens element is RLf, and a curvature radius of an image-side surface of the image-side lens element is RLr, the following condition can be satisfied: 0<(RLf+RLr)/(RLf−RLr)<3.50. Therefore, adjusting a shape of a specific lens element of the photographing lens assembly is favorable for obtaining a miniaturized configuration, controlling the total track length, and providing high image quality.

When the number of the lens elements of the photographing lens assembly is N, the following condition can be satisfied: 3≤N≤8. Therefore, the number of lens elements is determined according to actual requirements, which is favorable for obtaining a balance between miniaturization and the image quality, and also favorable for broadening the design flexibility. Preferably, the following condition can be satisfied: 4≤N≤8. More preferably, the following condition can also be satisfied: 5≤N≤8.

When a maximum value among all refractive indices of the lens elements of the photographing lens assembly is Nmax, the following condition can be satisfied: Nmax<1.70. Therefore, it is favorable for selecting proper material for each the lens element so as to reduce manufacturing cost and achieve compactness.

According to the present disclosure, at least one of the lens elements can have an Abbe number smaller than 22.0. Therefore, it is favorable for selecting proper material for each the lens element so as to correct chromatic aberration and prevent image overlap.

According to the present disclosure, the object-side lens element can have positive refractive power, and the image-side lens element can have negative refractive power. Therefore, adjusting the refractive power distribution of the photographing lens assembly is favorable for obtaining a balance between miniaturization and the image quality.

Figure 25:
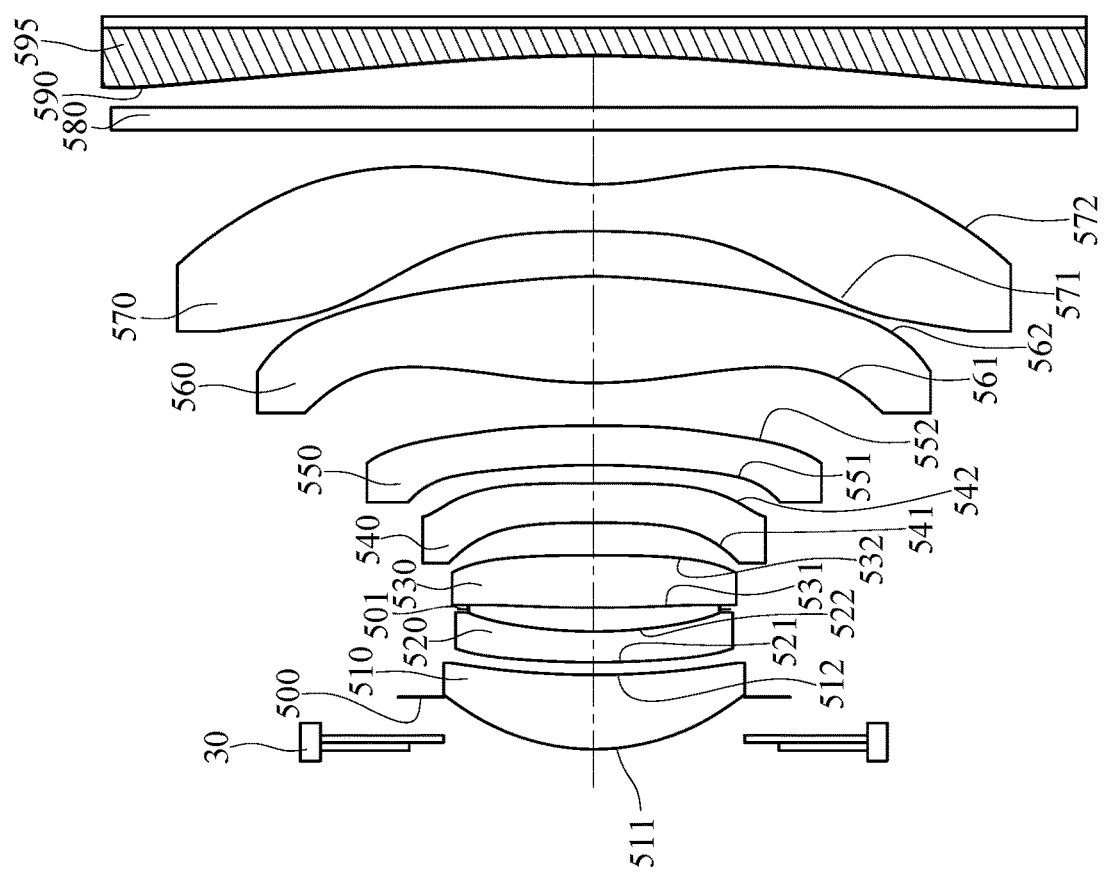
FIG. 25 is a schematic view of the image capturing unit with a photographing lens assembly including a mechanical component, according to the 5th embodiment of the present disclosure.

According to the present disclosure, the photographing lens assembly further includes a mechanical component, and the mechanical component can be located between an imaged object and the image surface. The mechanical component is configured to change an area for incident light to enter the photographing lens assembly. Therefore, adjusting the amount of incident light according to actual requirements is favorable for controlling image brightness under various shooting conditions (e.g., different distances from imaged objects, and different background brightness), and maintaining high image quality. Please refer to FIG. 25, which shows a schematic view of the image capturing unit with a photographing lens assembly including a mechanical component 30, according to the 5th embodiment of the present disclosure. The mechanical component 30 is, for example, a light baffle having an adjustable through hole for controlling the amount of incident light by changing the size of the through hole according to actual requirements.

Figure 26:
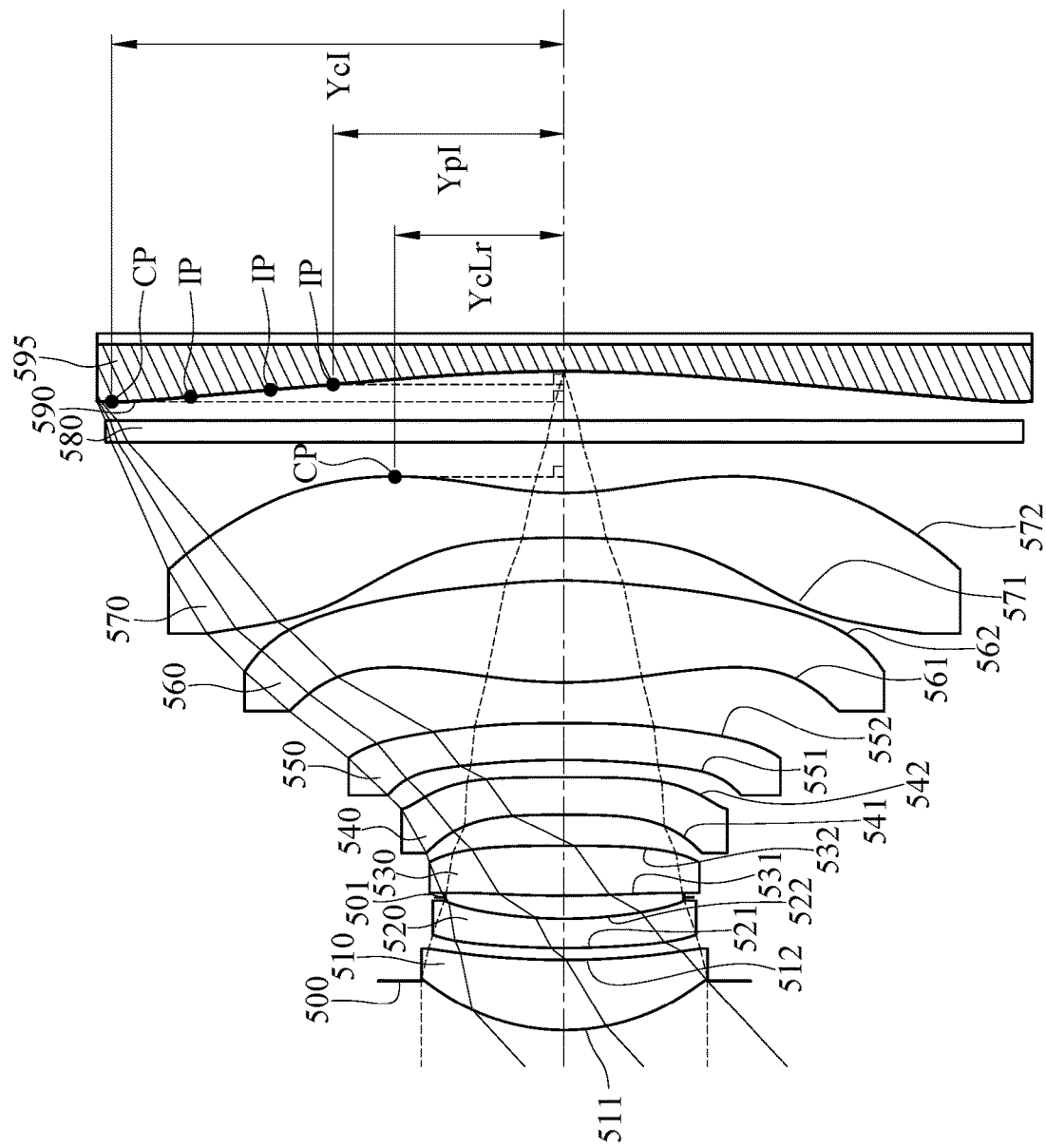
FIG. 26 shows a schematic view of YcLr, YpI and YcI according to the 5th embodiment of the present disclosure.

According to the present disclosure, the surface of the image sensor can have at least one critical point in an off-axis region thereof. When a vertical distance between a non-axial critical point on the image-side surface of the image-side lens element and the optical axis is YcLr, and a vertical distance between a non-axial critical point on the surface of the image sensor and the optical axis is YcI, the following condition can be satisfied: |YcLr/YcI|<1.0. Therefore, it is favorable for enhancing the capability of correcting off-axis aberrations on the image side of the photographing lens assembly, and enlarging the imaging range for various applications. Preferably, the following condition can also be satisfied: 0.03<|YcLr/YcI|<0.8. Please refer to FIG. 26, which shows a schematic view of YcLr and YcI according to the 5th embodiment of the present disclosure.

When the axial distance between the object-side surface of the object-side lens element and the image surface is TL, and the maximum image height of the photographing lens assembly (half of a diagonal length of an effective photosensitive area of an image sensor) is ImgH, the following condition can be satisfied: 0.30<TL/ImgH<1.80. Therefore, sufficient image height is favorable for broadening field of coverage so as to meet various requirements. Preferably, the following condition can also be satisfied: 0.50<TL/ImgH<1.60.

When an axial distance between the image-side surface of the image-side lens element and the image surface is BL, and the focal length of the photographing lens assembly is f, the following condition can be satisfied: 0.10<BL/f<0.50. Therefore, a proper ratio of the focal length and a back focal length of the photographing lens assembly is favorable for obtaining a miniaturized configuration and providing sufficient field of view.

When the vertical distance between the non-axial critical point on the surface of the image sensor and the optical axis is YcI, and the focal length of the photographing lens assembly is f, the following condition can be satisfied: 0.1<YcI/f<2.0. Therefore, a curved image sensor having critical point is not only favorable for minimizing the number of lens elements and reducing the total track length, but also favorable for improving peripheral image quality, thereby achieving miniaturization and high image quality. Preferably, the following condition can also be satisfied: 0.1<YcI/f<1.0.

When the curvature radius of the image surface in the paraxial region thereof is Ri, and the curvature radius of the image-side surface of the image-side lens element is RLr, the following condition can be satisfied: −100<Ri/RLr<0. Therefore, it is favorable for reducing the total track length, and also favorable for reducing field curvature on the image surface so as to improve the image quality. Preferably, the following condition can also be satisfied: −50<Ri/RLr<−4.5.

When the displacement in parallel with the optical axis from the axial vertex of the image surface to the maximum image height position on the image surface is SAGI, and the curvature radius of the image surface in the paraxial region thereof is Ri, the following condition can be satisfied: 0<|(10×SAGI)/Ri|<1.0. Therefore, a proper shape of the image surface is favorable for reducing field curvature, and also favorable for reducing the total track length so as to reduce the size of the photographing lens assembly, thereby achieving compactness. Preferably, the following condition can also be satisfied: 0.01<|(10×SAGI)/Ri|<0.35.

According to the present disclosure, the surface of the image sensor can have at least one inflection point in an off-axis region thereof. When a vertical distance between an inflection point on the surface of the image sensor and the optical axis is YpI, and the focal length of the photographing lens assembly is f, the following condition can be satisfied: 0.1<YpI/f<2.0. Therefore, a curved image sensor having at least one inflection point is not only favorable for minimizing the number of lens elements and reducing the total track length, but also favorable for improving peripheral image quality, thereby achieving miniaturization and high image quality. Preferably, the following condition can also be satisfied: 0.1<YpI/f<1.0. Please refer to FIG. 26, which shows a schematic view of YpI illustrating a vertical distance between an inflection point closest to the optical axis on the surface of the image sensor and the optical axis, according to the 5th embodiment of the present disclosure.

According to the present disclosure, the lens elements thereof can be made of glass or plastic material. When the lens elements are made of glass material, the distribution of the refractive power of the photographing lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing lens assembly can also be reduced.

In detail, the object-side surface and the image-side surface of each lens element of the photographing lens assembly can be all aspheric; therefore, it is favorable for correcting aberrations and reducing the total track length of the photographing lens assembly, and also favorable for minimizing the number of lens elements. Furthermore, the lens elements can be all made of plastic material; therefore, selecting proper material for each lens element is favorable for broadening the design flexibility of the lens elements.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image correction unit, such as a field flattener, can be optionally disposed between the lens element closest to the image side of the photographing lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the photographing lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing lens assembly and thereby provides a wider field of view for the same.

According to the above description of the present disclosure, the following specific embodiments are provided for further explanation.

1st Embodiment

Figure 1:
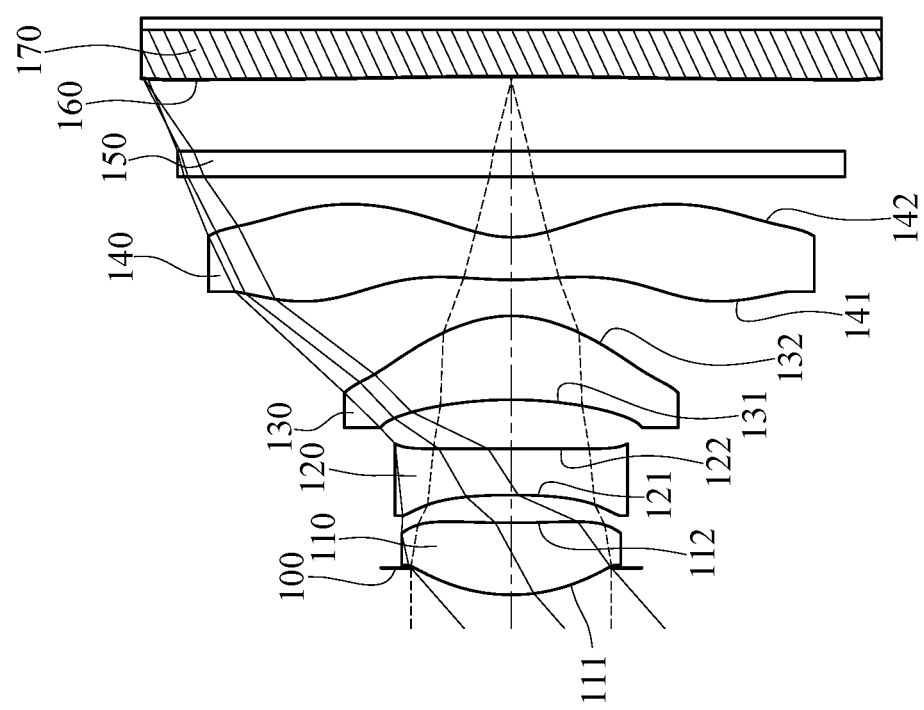
FIG. 1 is a schematic view of an image capturing unit according to the 1st embodiment of the present disclosure.

FIG. 1 is a schematic view of an image capturing unit according to the 1st embodiment of the present disclosure. In FIG. 1, the image capturing unit includes the photographing lens assembly (its reference numeral is omitted) of the present disclosure and an image sensor 170. The photographing lens assembly includes, in order from an object side to an image side, an aperture stop 100, a first lens element 110, a second lens element 120, a third lens element 130, a fourth lens element 140, a filter 150 and an image surface 160. The photographing lens assembly includes four single and non-cemented lens elements (110, 120, 130 and 140) with no additional lens element disposed between the first lens element 110 and the fourth lens element 140.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric.

The filter 150 is made of glass material and located between the fourth lens element 140 and the image surface 160, and will not affect the focal length of the photographing lens assembly.

The image surface 160 is concave in a paraxial region thereof, and the image surface 160 has at least one convex shape in an off-axis region thereof.

The image sensor 170 is disposed on or near the image surface 160 of the photographing lens assembly, and the image sensor 170 has at least one critical point and at least one inflection point in an off-axis region thereof.

The equation of the aspheric surface profiles of the aforementioned lens elements and the image surface 160 of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with an optical axis between a profile point on the aspheric surface and an axial vertex of the aspheric surface;

Y is the vertical distance from the profile point on the aspheric surface to the optical axis;

R is the curvature radius of the aspheric surface at the profile point;

k is the conic coefficient; and

Ai is the i-th aspheric coefficient, and in the embodiments, i may be, but is not limited to, 4, 6, 8, 10, 12, 14 and 16.

In the photographing lens assembly of the image capturing unit according to the 1st embodiment, a focal length of the photographing lens assembly is f, an f-number of the photographing lens assembly is Fno, half of a maximum field of view of the photographing lens assembly is HFOV, a distance between an imaged object and the aperture stop 100 is Obj, and a distance between the filter 150 and the image surface 160 is Imd. With different focusing conditions, the aforementioned parameters have different values. In this embodiment, two modes of the photographing lens assembly are provided according to different focusing conditions.

Figure 2:
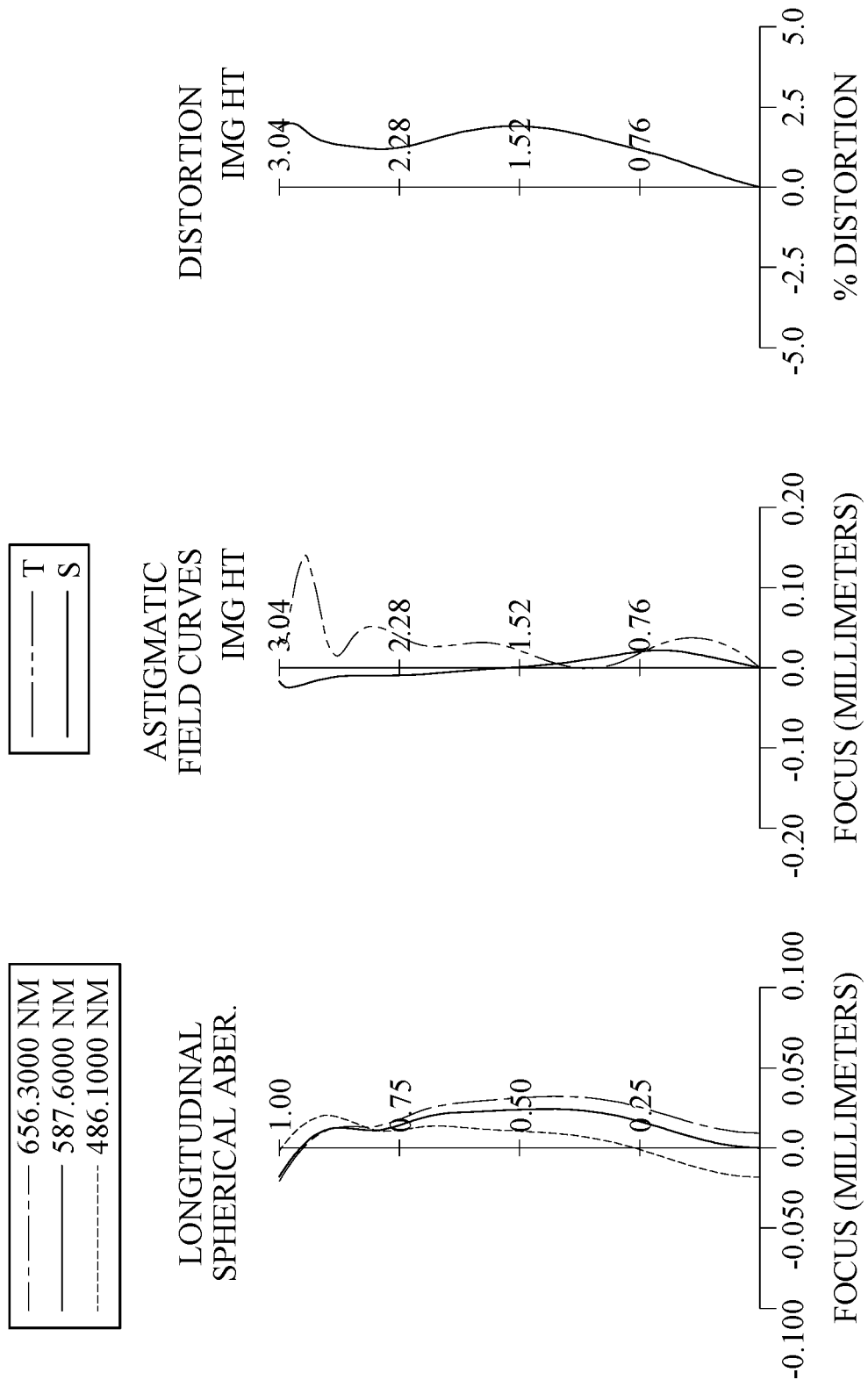
FIG. 2 shows spherical aberration curves, astigmatic field curves and a distortion curve of a first mode of the image capturing unit according to the 1st embodiment.

Please refer to FIG. 2, which shows spherical aberration curves, astigmatic field curves and a distortion curve of a first mode of the image capturing unit according to the 1st embodiment. In this example, the following conditions are satisfied: f=3.39 millimeters (mm), Fno=2.05, HFOV=41.3 degrees (deg.).

When half of the maximum field of view of the photographing lens assembly is HFOV, the following condition is satisfied: tan(HFOV)=0.88.

When the distance between the imaged object and the aperture stop 100 is Obj, the following condition is satisfied: Obj=10000.00 [mm].

When the distance between the filter 150 and the image surface 160 is Imd, the following condition is satisfied: Imd=0.619 [mm].

When a maximum value among all central thicknesses of the lens elements of the photographing lens assembly is CTmax, the following condition is satisfied: CTmax=0.69 [mm].

When a minimum value among all central thicknesses of the lens elements of the photographing lens assembly is CTmin, the following condition is satisfied: CTmin=0.35 [mm].

When a conic coefficient of the image surface 160 is k, and an i-th aspheric coefficient of the image surface 160 is Ai, the following condition is satisfied:

$$|k|+\Sigma|Ai|=41.13.$$

When a sum of axial distances between every adjacent lens elements of the photographing lens assembly is ΣAT, and a sum of central thicknesses of the plurality of lens elements of the photographing lens assembly is ΣCT, the following condition is satisfied: ΣAT/ΣCT=0.46.

According to the present disclosure, the lens elements of the photographing lens assembly include an object-side lens element closest to the object side. When a curvature radius of the object-side surface of the object-side lens element is R1, and a curvature radius of the image-side surface of the object-side lens element is R2, the following condition is satisfied: (R1+R2)/(R1−R2)=−1.46. In this embodiment, the object-side lens element is the first lens element 110. Accordingly, a curvature radius of the object-side surface 111 of the first lens element 110 is R1, and a curvature radius of the image-side surface 112 of the first lens element 110 is R2.

According to the present disclosure, the lens elements of the photographing lens assembly include an image-side lens element closest to the image surface 160. When a curvature radius of the object-side surface of the image-side lens element is RLf, and a curvature radius of the image-side surface of the image-side lens element is RLr, the following condition is satisfied: (RLf+RLr)/(RLf−RLr)=1.84. In this embodiment, the image-side lens element is the fourth lens element 140. Accordingly, a curvature radius of the object-side surface 141 of the fourth lens element 140 is RLf, and a curvature radius of the image-side surface 142 of the fourth lens element 140 is RLr.

When the focal length of the photographing lens assembly is f, and a curvature radius of the image surface 160 in the paraxial region thereof is Ri, the following condition is satisfied: |f/Ri|=0.09.

When the curvature radius of the image surface 160 in the paraxial region thereof is Ri, and the curvature radius of the image-side surface of the image-side lens element is RLr, the following condition is satisfied: Ri/RLr=−42.50.

When an axial distance between the image-side surface of the image-side lens element and the image surface 160 is BL, and the focal length of the photographing lens assembly is f, the following condition is satisfied: BL/f=0.39. In this embodiment, an axial distance between the image-side surface 142 of the fourth lens element 140 and the image surface 160 is BL.

When a displacement in parallel with an optical axis from an axial vertex of the image surface 160 to a maximum image height position on the image surface 160 is SAGI, and the focal length of the photographing lens assembly is f, the following condition is satisfied: |(10×SAGI)/f|=0.05.

When the displacement in parallel with the optical axis from the axial vertex of the image surface 160 to the maximum image height position on the image surface 160 is SAGI, and the curvature radius of the image surface 160 in the paraxial region thereof is Ri, the following condition is satisfied: |(10×SAGI)/Ri|=0.004.

When a displacement in parallel with the optical axis from the axial vertex of the image surface 160 to a position of 0.8 times the maximum image height on the image surface 160 is SAGI0.8, and a displacement in parallel with the optical axis from the axial vertex of the image surface 160 to a position of 0.4 times the maximum image height on the image surface 160 is SAGI0.4, the following condition is satisfied: |SAGI0.8/SAGI0.4|=1.78.

When an axial distance between the object-side surface of the object-side lens element and the image surface 160 is TL, the following condition is satisfied: TL=4.29 [mm]. In this embodiment, an axial distance between the object-side surface 111 of the first lens element 110 and the image surface 160 is TL.

When the axial distance between the object-side surface of the object-side lens element and the image surface 160 is TL, and a maximum image height of the photographing lens assembly is ImgH, the following condition is satisfied: TL/ImgH=1.41.

When a maximum value among all refractive indices of the lens elements of the photographing lens assembly is Nmax, the following condition is satisfied: Nmax=1.660. In this embodiment, the refractive index of the second lens element 120 is larger than the refractive indices of the first lens element 110, the third lens element 130 and the fourth lens element 140. Accordingly, the refractive index of the second lens element 120 is Nmax.

When a vertical distance between an inflection point on a surface of the image sensor 170 and the optical axis is YpI, and the focal length of the photographing lens assembly is f, the following condition is satisfied: YpI/f=0.29.

When a vertical distance between a non-axial critical point on the surface of the image sensor 170 and the optical axis is YcI, and the focal length of the photographing lens assembly is f, the following condition is satisfied: YcI/f=0.80.

When a vertical distance between a non-axial critical point on the image-side surface of the image-side lens element and the optical axis is YcLr, and the vertical distance between a non-axial critical point on the surface of the image sensor 170 and the optical axis is YcI, the following condition is satisfied: |YcLr/YcI|=0.49. In this embodiment, a vertical distance between a non-axial critical point on the image-side surface 142 of the fourth lens element 140 and the optical axis is YcLr.

When an angle between a chief ray at the maximum image height position on the image surface 160 and a normal line of the image surface 160 in the paraxial region thereof is CRA, and an angle between a marginal ray on a meridional plane at the maximum image height position on the image surface 160 and the normal line of the image surface 160 in the paraxial region thereof is MRA, the following condition is satisfied: |(CRA−MRA)/CRA|=0.18 and 0.24.

When a vertical distance between a point at the maximum image height position on the image surface 160 in which the chief ray is incident and the optical axis is CRH, and a vertical distance between a point at the maximum image height position on the image surface 160 in which the marginal ray on the meridional plane is incident and the optical axis is MRH, the following condition is satisfied: |(CRH−MRH)×10|=0.39 [mm] and 0.04 [mm].

When a distortion in the maximum image height position of the photographing lens assembly is DIST, the following condition is satisfied: |DIST|=1.95%.

When the number of the lens elements of the photographing lens assembly is N, the following condition is satisfied: N=4.

Figure 3:
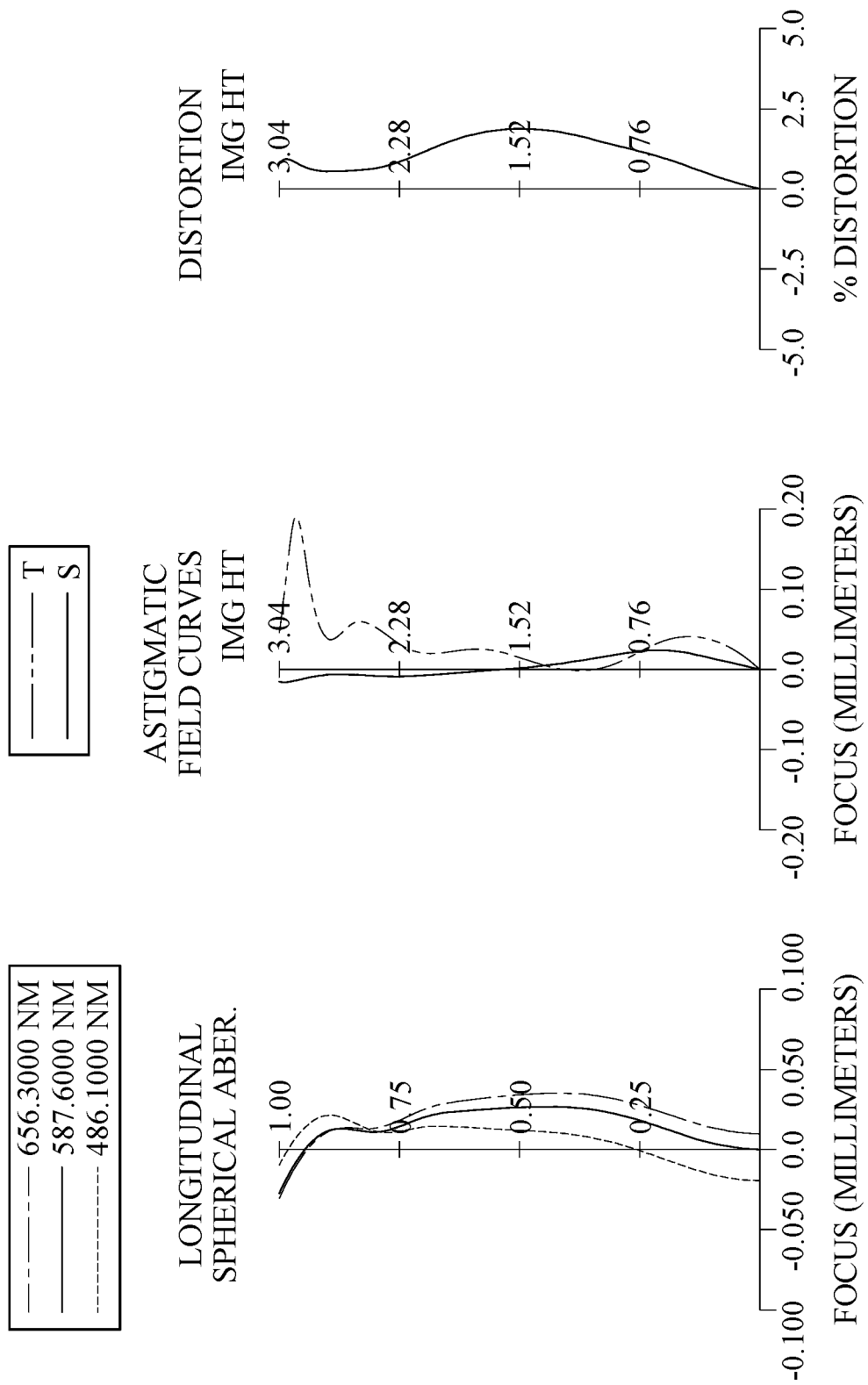
FIG. 3 shows spherical aberration curves, astigmatic field curves and a distortion curve of a second mode of the image capturing unit according to the 1st embodiment.

Please refer to FIG. 3, which shows spherical aberration curves, astigmatic field curves and a distortion curve of a second mode of the image capturing unit according to the 1st embodiment. In this example, the following conditions are satisfied: f=3.39 millimeters, Fno=2.10, HFOV=40.9 degrees.

When half of the maximum field of view of the photographing lens assembly is HFOV, the following condition is satisfied: tan(HFOV)=0.87.

When the distance between the imaged object and the aperture stop 100 is Obj, the following condition is satisfied: Obj=150.00 [mm].

When the distance between the filter 150 and the image surface 160 is Imd, the following condition is satisfied: Imd=0.697 [mm].

When the maximum value among all central thicknesses of the lens elements of the photographing lens assembly is CTmax, the following condition is satisfied: CTmax=0.69 [mm].

When the minimum value among all central thicknesses of the lens elements of the photographing lens assembly is CTmin, the following condition is satisfied: CTmin=0.35 [mm].

When the conic coefficient of the image surface 160 is k, and the i-th aspheric coefficient of the image surface 160 is Ai, the following condition is satisfied: |k|+Σ|Ai|=41.13.

When the sum of axial distances between every adjacent lens elements of the photographing lens assembly is ΣAT, and the sum of central thicknesses of the plurality of lens elements of the photographing lens assembly is ΣCT, the following condition is satisfied: ΣAT/ΣCT=0.46.

When the curvature radius of the object-side surface of the object-side lens element is R1, and the curvature radius of the image-side surface of the object-side lens element is R2, the following condition is satisfied: (R1+R2)/(R1−R2)=−1.46.

When the curvature radius of the object-side surface of the image-side lens element is RLf, and the curvature radius of the image-side surface of the image-side lens element is RLr, the following condition is satisfied:

$$(RLf+RLr)/(RLf-RLr)=1.84.$$

When the focal length of the photographing lens assembly is f, and the curvature radius of the image surface 160 in the paraxial region thereof is Ri, the following condition is satisfied: |f/Ri|=0.09.

When the curvature radius of the image surface 160 in the paraxial region thereof is Ri, and the curvature radius of the image-side surface of the image-side lens element is RLr, the following condition is satisfied: Ri/RLr=−42.50.

When the axial distance between the image-side surface of the image-side lens element and the image surface 160 is BL, and the focal length of the photographing lens assembly is f, the following condition is satisfied: BL/f=0.41.

When the displacement in parallel with the optical axis from the axial vertex of the image surface 160 to the maximum image height position on the image surface 160 is SAGI, and the focal length of the photographing lens assembly is f, the following condition is satisfied: |(10×SAGI)/f|=0.05.

When the displacement in parallel with the optical axis from the axial vertex of the image surface 160 to the maximum image height position on the image surface 160 is SAGI, and the curvature radius of the image surface 160 in the paraxial region thereof is Ri, the following condition is satisfied: |(10×SAGI)/Ri|=0.004.

When the displacement in parallel with the optical axis from the axial vertex of the image surface 160 to the position of 0.8 times the maximum image height on the image surface 160 is SAGI0.8, and the displacement in parallel with the optical axis from the axial vertex of the image surface 160 to the position of 0.4 times the maximum image height on the image surface 160 is SAGI0.4, the following condition is satisfied: |SAGI0.8/SAGI0.4|=1.78.

When the axial distance between the object-side surface of the object-side lens element and the image surface 160 is TL, the following condition is satisfied: TL=4.36 [mm].

When the axial distance between the object-side surface of the object-side lens element and the image surface 160 is TL, and the maximum image height of the photographing lens assembly is ImgH, the following condition is satisfied: TL/ImgH=1.44.

When the maximum value among all refractive indices of the lens elements of the photographing lens assembly is Nmax, the following condition is satisfied: Nmax=1.660.

When the vertical distance between an inflection point on the surface of the image sensor 170 and the optical axis is YpI, and the focal length of the photographing lens assembly is f, the following condition is satisfied: YpI/f=0.29.

When the vertical distance between a non-axial critical point on the surface of the image sensor 170 and the optical axis is YcI, and the focal length of the photographing lens assembly is f, the following condition is satisfied: YcI/f=0.80.

When the vertical distance between a non-axial critical point on the image-side surface of the image-side lens element and the optical axis is YcLr, and the vertical distance between a non-axial critical point on the surface of the image sensor 170 and the optical axis is YcI, the following condition is satisfied: |YcLr/YcI|=0.49.

When the angle between the chief ray at the maximum image height position on the image surface 160 and the normal line of the image surface 160 in the paraxial region thereof is CRA, and the angle between the marginal ray on the meridional plane at the maximum image height position on the image surface 160 and the normal line of the image surface 160 in the paraxial region thereof is MRA, the following condition is satisfied: |(CRA−MRA)/CRA|=0.20 and 0.22.

When the vertical distance between the point at the maximum image height position on the image surface 160 in which the chief ray is incident and the optical axis is CRH, and the vertical distance between the point at the maximum image height position on the image surface 160 in which the marginal ray on the meridional plane is incident and the optical axis is MRH, the following condition is satisfied: |(CRH−MRH)×10|=0.46 [mm] and 0.16 [mm].

When the distortion in the maximum image height position of the photographing lens assembly is DIST, the following condition is satisfied: |DIST|=0.84%.

When the number of the lens elements of the photographing lens assembly is N, the following condition is satisfied: N=4.

The detailed optical data of the first and the second modes of the 1st embodiment are shown in Table 1 and Table 2, and the aspheric surface data are shown in Table 3 below.

TABLE 1

1st Mode of 1st Embodiment
f = 3.39 mm, Fno = 2.05, HFOV = 41.3 deg.

| Surface # | | Curvature Radius | Thickness | Material | Index | Abbe # | Focal Length |
|---|---|---|---|---|---|---|---|
| 0 | Object | Plano | 10000.000 | | | | |
| 1 | Ape. Stop | Plano | −0.222 | | | | |
| 2 | Lens 1 | 1.490 (ASP) | 0.595 | Plastic | 1.544 | 56.0 | 3.26 |
| 3 | | 8.026 (ASP) | 0.230 | | | | |
| 4 | Lens 2 | −5.146 (ASP) | 0.382 | Plastic | 1.660 | 20.4 | −8.27 |
| 5 | | −92.495 (ASP) | 0.406 | | | | |
| 6 | Lens 3 | −3.306 (ASP) | 0.693 | Plastic | 1.544 | 56.0 | 2.50 |
| 7 | | −1.035 (ASP) | 0.298 | | | | |
| 8 | Lens 4 | 3.002 (ASP) | 0.353 | Plastic | 1.511 | 56.8 | −2.61 |
| 9 | | 0.885 (ASP) | 0.500 | | | | |
| 10 | Filter | Plano | 0.210 | Glass | 1.517 | 64.2 | — |
| 11 | | Plano | 0.619 | | | | |
| 12 | Image | −37.632 (ASP) | — | | | | |

Note:
Reference wavelength is 587.6 nm (d-line).

TABLE 2

2nd Mode of 1st Embodiment
f = 3.39 mm, Fno = 2.10, HFOV = 40.9 deg.

| Surface # | | Curvature Radius | Thickness | Material | Index | Abbe # | Focal Length |
|---|---|---|---|---|---|---|---|
| 0 | Object | Plano | 150.000 | | | | |
| 1 | Ape. Stop | Plano | −0.222 | | | | |
| 2 | Lens 1 | 1.490 (ASP) | 0.595 | Plastic | 1.544 | 56.0 | 3.26 |
| 3 | | 8.026 (ASP) | 0.230 | | | | |
| 4 | Lens 2 | −5.146 (ASP) | 0.382 | Plastic | 1.660 | 20.4 | −8.27 |
| 5 | | −92.495 (ASP) | 0.406 | | | | |
| 6 | Lens 3 | −3.306 (ASP) | 0.693 | Plastic | 1.544 | 56.0 | 2.50 |
| 7 | | −1.035 (ASP) | 0.298 | | | | |
| 8 | Lens 4 | 3.002 (ASP) | 0.353 | Plastic | 1.511 | 56.8 | −2.61 |
| 9 | | 0.885 (ASP) | 0.500 | | | | |
| 10 | Filter | Plano | 0.210 | Glass | 1.517 | 64.2 | — |
| 11 | | Plano | 0.697 | | | | |
| 12 | Image | −37.632 (ASP) | — | | | | |

Note:
Reference wavelength is 587.6 nm (d-line).

TABLE 3

Aspheric Coefficients

| Surface # | 2 | 3 | 4 | 5 | 6 |
|---|---|---|---|---|---|
| k = | −1.0162E+00 | 2.4362E+01 | −4.3599E+01 | 6.7500E+01 | −8.3961E+00 |
| A4 = | 1.3300E−02 | −6.5290E−02 | −1.1734E−01 | 6.9472E−03 | −2.9109E−02 |
| A6 = | 1.7484E−01 | −1.0697E−01 | −2.7706E−01 | 1.0635E−01 | 3.1510E−01 |
| A8 = | −5.7436E−01 | −2.8656E−02 | 8.0999E−01 | −5.8214E−01 | −1.4839E+00 |
| A10 = | 8.6638E−01 | −1.7313E−01 | −1.8657E+00 | 1.2820E+00 | 3.1721E+00 |
| A12 = | −5.8416E−01 | 1.2362E−01 | 2.0094E+00 | −1.2170E+00 | −3.7200E+00 |
| A14 = | — | — | −6.6131E−01 | 4.8022E−01 | 2.3092E+00 |
| A16 = | — | — | — | — | −5.9913E−01 |

| Surface # | 7 | 8 | 9 | 12 |
|---|---|---|---|---|
| k = | −1.8175E+00 | −8.6973E+01 | −5.2868E+00 | −4.1125E+01 |
| A4 = | 9.4339E−02 | −1.1214E−01 | −1.0744E−01 | 2.5234E−03 |
| A6 = | −2.2311E−01 | −3.2760E−02 | 3.7052E−02 | −9.2279E−05 |
| A8 = | 3.2933E−01 | 6.3724E−02 | −7.4634E−03 | −3.2896E−05 |
| A10 = | −4.0160E−01 | −2.6382E−02 | 1.9181E−04 | 2.8905E−06 |
| A12 = | 3.3365E−01 | 5.2191E−03 | 2.2803E−04 | — |
| A14 = | −1.3916E−01 | −5.1656E−04 | −3.7192E−05 | — |
| A16 = | 2.1578E−02 | 2.0501E−05 | 1.7026E−06 | — |

In Table 1 and Table 2, the curvature radius, the thickness and the focal length are shown in millimeters (mm). Surface numbers 0-12 represent the surfaces sequentially arranged from the object side to the image side along the optical axis. In Table 3, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 to Table 3 of the 1st embodiment. Therefore, an explanation in this regard will not be provided again.

2nd Embodiment

Figure 4:
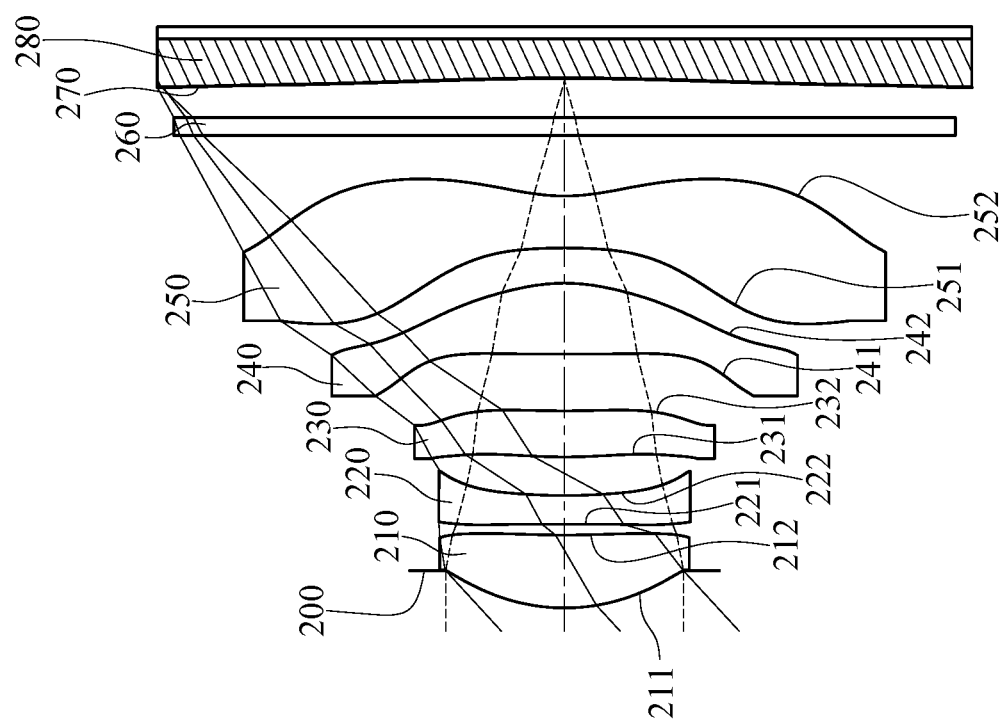
FIG. 4 is a schematic view of an image capturing unit according to the 2nd embodiment of the present disclosure.
Figure 5:
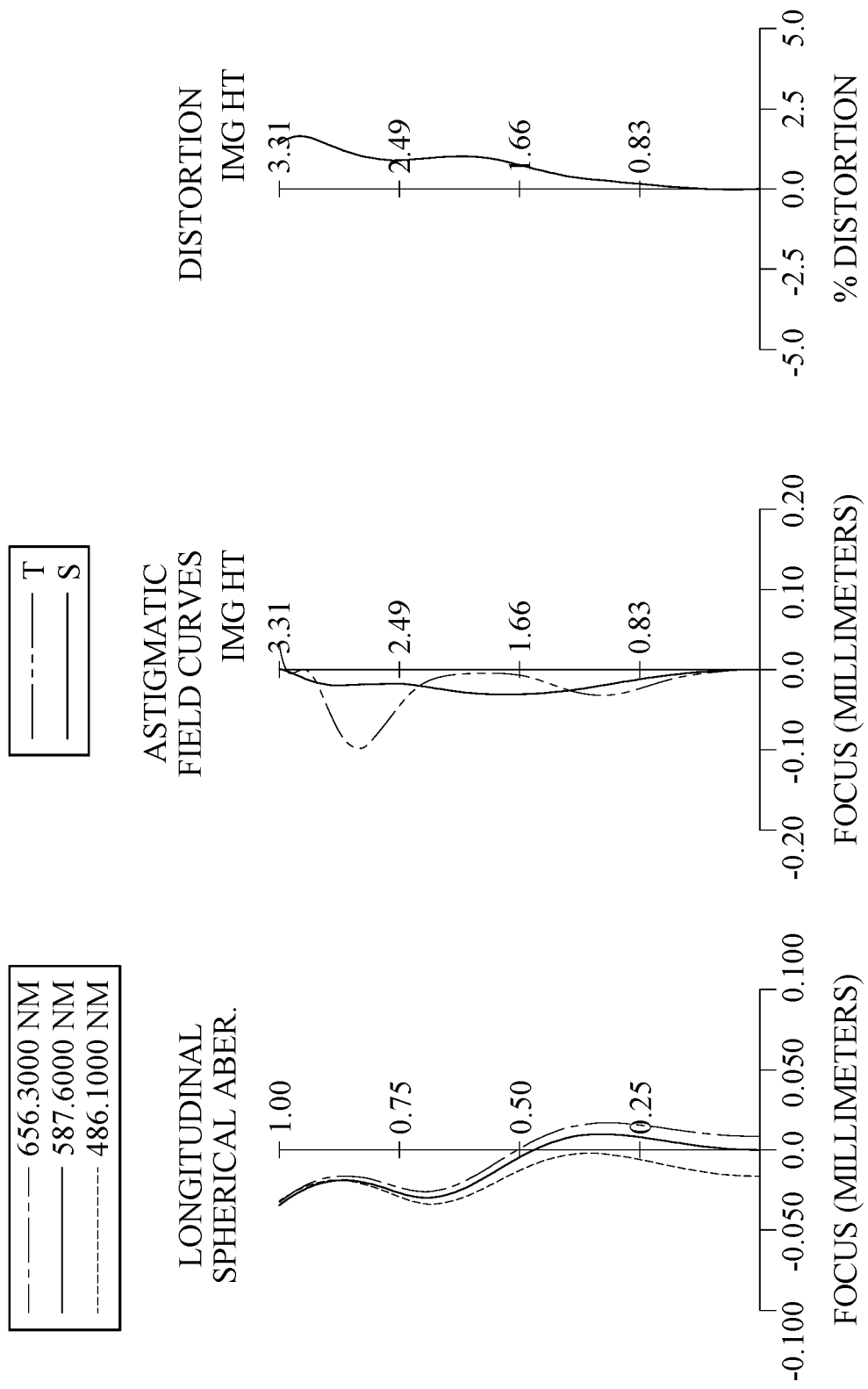
FIG. 5 shows spherical aberration curves, astigmatic field curves and a distortion curve of a first mode of the image capturing unit according to the 2nd embodiment.
Figure 6:
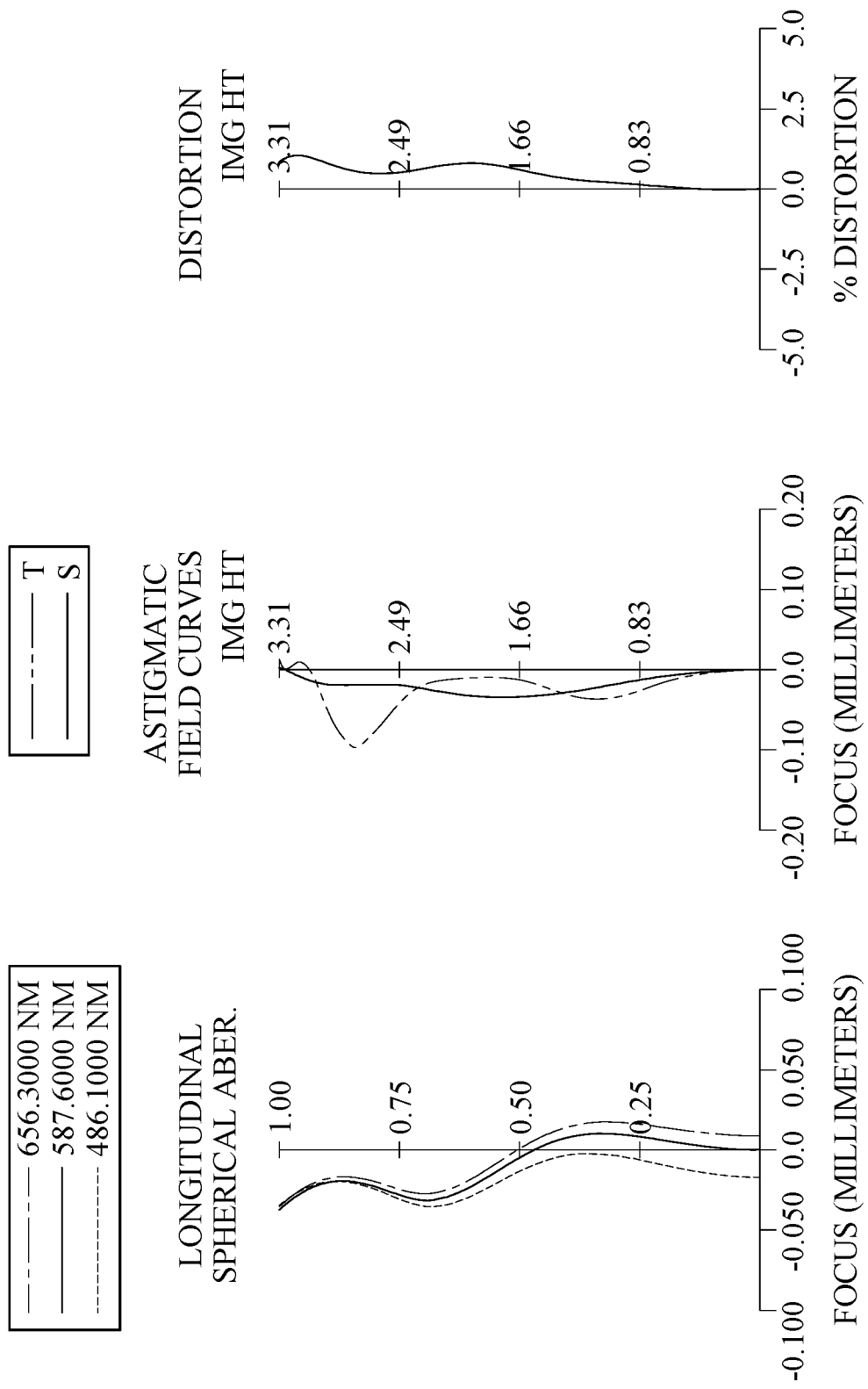
FIG. 6 shows spherical aberration curves, astigmatic field curves and a distortion curve of a second mode of the image capturing unit according to the 2nd embodiment.

FIG. 4 is a schematic view of an image capturing unit according to the 2nd embodiment of the present disclosure. FIG. 5 shows, in order from left to right, spherical aberration curves, astigmatic field curves and a distortion curve of a first mode of the image capturing unit according to the 2nd embodiment. FIG. 6 shows, in order from left to right, spherical aberration curves, astigmatic field curves and a distortion curve of a second mode of the image capturing unit according to the 2nd embodiment. In FIG. 4, the image capturing unit includes the photographing lens assembly (its reference numeral is omitted) of the present disclosure and an image sensor 280. The photographing lens assembly includes, in order from an object side to an image side, an aperture stop 200, a first lens element 210, a second lens element 220, a third lens element 230, a fourth lens element 240, a fifth lens element 250, a filter 260 and an image surface 270. The photographing lens assembly includes five single and non-cemented lens elements (210, 220, 230, 240 and 250) with no additional lens element disposed between the first lens element 210 and the fifth lens element 250.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric.

The filter 260 is made of glass material and located between the fifth lens element 250 and the image surface 270, and will not affect the focal length of the photographing lens assembly.

The image surface 270 is concave in a paraxial region thereof, and the image surface 270 has at least one convex shape in an off-axis region thereof.

The image sensor 280 is disposed on or near the image surface 270 of the photographing lens assembly, and the image sensor 280 has at least one inflection point in an off-axis region thereof.

The detailed optical data of the 2nd embodiment are shown in Table 4 and Table 5, and the aspheric surface data are shown in Table 6 below.

TABLE 4

1st Mode of 2nd Embodiment
f = 3.63 mm, Fno = 1.85, HFOV = 42.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.308 | | | | |
| 2 | Lens 1 | 1.609 (ASP) | 0.602 | Plastic | 1.545 | 56.0 | 3.74 |
| 3 | | 6.633 (ASP) | 0.089 | | | | |
| 4 | Lens 2 | 16.584 (ASP) | 0.238 | Plastic | 1.661 | 20.3 | −8.75 |
| 5 | | 4.260 (ASP) | 0.319 | | | | |
| 6 | Lens 3 | 4.211 (ASP) | 0.381 | Plastic | 1.544 | 56.0 | 14.88 |
| 7 | | 8.497 (ASP) | 0.469 | | | | |
| 8 | Lens 4 | 85.666 (ASP) | 0.587 | Plastic | 1.544 | 56.0 | 2.70 |
| 9 | | −1.492 (ASP) | 0.291 | | | | |
| 10 | Lens 5 | −4.987 (ASP) | 0.429 | Plastic | 1.544 | 56.0 | −2.08 |
| 11 | | 1.507 (ASP) | 0.500 | | | | |
| 12 | Filter | Plano | 0.150 | Glass | 1.517 | 64.2 | — |
| 13 | | Plano | 0.325 | | | | |
| 14 | Image | −23.948 (ASP) | — | | | | |

Note:
Reference wavelength is 587.6 nm (d-line).

The definitions of these parameters shown in the following table are the same as those stated in the 1st embodiment with corresponding values for the 2nd embodiment, so an explanation in this regard will not be provided again.

Moreover, these parameters can be calculated from Table 4 and Table 6 as the following values and satisfy the following conditions:

1st Mode of 2nd Embodiment

| | | | |
|---|---|---|---|
| f [mm] | 3.63 | \|(10 × SAGI)/f\| | 0.21 |
| Fno | 1.85 | \|(10 × SAGI)/Ri\| | 0.032 |
| HFOV [deg.] | 42.6 | \|SAGI0.8/SAGI0.4\| | 2.09 |
| tan(HFOV) | 0.92 | TL [mm] | 4.38 |

-continued

1st Mode of 2nd Embodiment

| | | | |
|---|---|---|---|
| Obj [mm] | Infinity | TL/ImgH | 1.32 |
| Imd [mm] | 0.325 | Nmax | 1.661 |
| CTmax [mm] | 0.60 | Ypl/f | 0.34 |
| CTmin [mm] | 0.24 | Ycl/f | — |
| \|k\| + Σ\|Ai\| | 99.00 | \|YcLr/Ycl\| | — |
| ΣAT/ΣCT | 0.52 | \|(CRA − MRA)/CRA\| | 0.22 |
| (R1 + R2)/(R1 − R2) | −1.64 | | 0.26 |
| (RLf + RLr)/(RLf − RLr) | 0.54 | \|(CRH − MRH) × 10\| [mm] | 0.47 |
| \|f/Ri\| | 0.15 | | 0.12 |
| Ri/RLr | −15.89 | \|DIST\| | 1.49% |
| BL/f | 0.27 | N | 5 |

TABLE 5

2nd Mode of 2nd Embodiment
f = 3.63 mm, Fno = 1.88, HFOV = 42.3 deg.

| Surface # | | Curvature Radius | Thickness | Material | Index | Abbe # | Focal Length |
|---|---|---|---|---|---|---|---|
| 0 | Object | Plano | 350.000 | | | | |
| 1 | Ape. Stop | Plano | −0.308 | | | | |
| 2 | Lens 1 | 1.609 (ASP) | 0.602 | Plastic | 1.545 | 56.0 | 3.74 |
| 3 | | 6.633 (ASP) | 0.089 | | | | |
| 4 | Lens 2 | 16.584 (ASP) | 0.238 | Plastic | 1.661 | 20.3 | −8.75 |
| 5 | | 4.260 (ASP) | 0.319 | | | | |
| 6 | Lens 3 | 4.211 (ASP) | 0.381 | Plastic | 1.544 | 56.0 | 14.88 |
| 7 | | 8.497 (ASP) | 0.469 | | | | |
| 8 | Lens 4 | 85.666 (ASP) | 0.587 | Plastic | 1.544 | 56.0 | 2.70 |
| 9 | | −1.492 (ASP) | 0.291 | | | | |
| 10 | Lens 5 | −4.987 (ASP) | 0.429 | Plastic | 1.544 | 56.0 | −2.08 |
| 11 | | 1.507 (ASP) | 0.500 | | | | |
| 12 | Filter | Plano | 0.150 | Glass | 1.517 | 64.2 | — |
| 13 | | Plano | 0.362 | | | | |
| 14 | Image | −23.948 (ASP) | — | | | | |

Note:
Reference wavelength is 587.6 nm (d-line).

The definitions of these parameters shown in the following table are the same as those stated in the 1st embodiment with corresponding values for the 2nd embodiment, so an explanation in this regard will not be provided again.

Moreover, these parameters can be calculated from Table 5 and Table 6 as the following values and satisfy the following conditions:

| 2nd Mode of 2nd Embodiment | | | |
|---|---|---|---|
| f [mm] | 3.63 | \|(10 × SAGI)/f\| | 0.21 |
| Fno | 1.88 | \|(10 × SAGI)/Ri\| | 0.032 |
| HFOV [deg.] | 42.3 | \|SAGI0.8/SAGI0.4\| | 2.09 |
| tan(HFOV) | 0.91 | TL [mm] | 4.42 |
| Obj [mm] | 350.000 | TL/ImgH | 1.33 |
| Imd [mm] | 0.362 | Nmax | 1.661 |
| CTmax [mm] | 0.60 | Ypl/f | 0.34 |
| CTmin [mm] | 0.24 | Ycl/f | — |
| \|k\| + Σ\|Ai\| | 99.00 | \|YcLr/Ycl\| | — |
| ΣAT/ΣCT | 0.52 | \|(CRA − MRA)/CRA\| | 0.23 |
| (R1 + R2)/(R1 − R2) | −1.64 | | 0.26 |
| (RLf + RLr)/(RLf − RLr) | 0.54 | \|(CRH − MRH) × 10\| [mm] | 0.23 |
| \|f/Ri\| | 0.15 | | 0.29 |
| Ri/RLr | −15.89 | \|DIST\| | 0.89% |
| BL/f | 0.28 | N | 5 |

In the 2nd embodiment, the equation of the aspheric surface profiles of the aforementioned lens elements is the same as the equation of the 1st embodiment.

TABLE 6

| Aspheric Coefficients | | | | | | |
|---|---|---|---|---|---|---|
| Surface # | 2 | 3 | 4 | 5 | 6 | 7 |
| k = | −1.5051E−01 | 8.9108E+00 | 9.0000E+01 | −1.4697E+01 | −1.3923E+00 | 3.3069E+01 |
| A4 = | 5.9503E−03 | −1.5746E−01 | −2.6017E−01 | −1.2868E−01 | −1.6797E−01 | −1.1654E−01 |
| A6 = | −3.6034E−02 | 1.4805E−01 | 5.6050E−01 | 4.2750E−01 | −7.2832E−02 | −1.8535E−01 |
| A8 = | 1.4283E−01 | −8.6791E−02 | −5.0162E−01 | −3.0089E−01 | 5.6635E−01 | 4.7463E−01 |
| A10 = | −3.4991E−01 | 3.8550E−02 | 2.2136E−01 | 8.5946E−02 | −1.0663E+00 | −6.0430E−01 |
| A12 = | 3.5661E−01 | −4.7985E−02 | −3.8581E−02 | −2.3237E−03 | 9.2201E−01 | 3.7446E−01 |
| A14 = | −1.4064E−01 | 1.3146E−02 | — | — | −2.9634E−01 | −8.3484E−02 |

| Surface # | 8 | 9 | 10 | 11 | 14 |
|---|---|---|---|---|---|
| k = | −9.9000E+01 | −5.9206E+00 | 2.7243E+00 | −9.8219E+00 | −9.9000E+01 |
| A4 = | 7.3317E−02 | 5.5391E−02 | −1.4263E−01 | −1.1479E−01 | 1.9569E−03 |
| A6 = | −1.7097E−01 | −1.3173E−01 | −7.2846E−03 | 5.8933E−02 | −6.2520E−05 |
| A8 = | 6.4352E−02 | 8.3581E−02 | 5.6243E−02 | −2.0092E−02 | −1.2374E−05 |
| A10 = | 5.6812E−02 | −1.9263E−02 | −2.4267E−02 | 4.2718E−03 | 7.6107E−07 |
| A12 = | −8.5982E−02 | 3.5472E−04 | 4.7191E−03 | −5.8384E−04 | — |
| A14 = | 3.8716E−02 | 4.9971E−04 | −4.5225E−04 | 4.7571E−05 | — |
| A16 = | −5.8099E−03 | −5.7696E−05 | 1.7423E−05 | −1.7052E−06 | — |

3rd Embodiment

Figure 7:
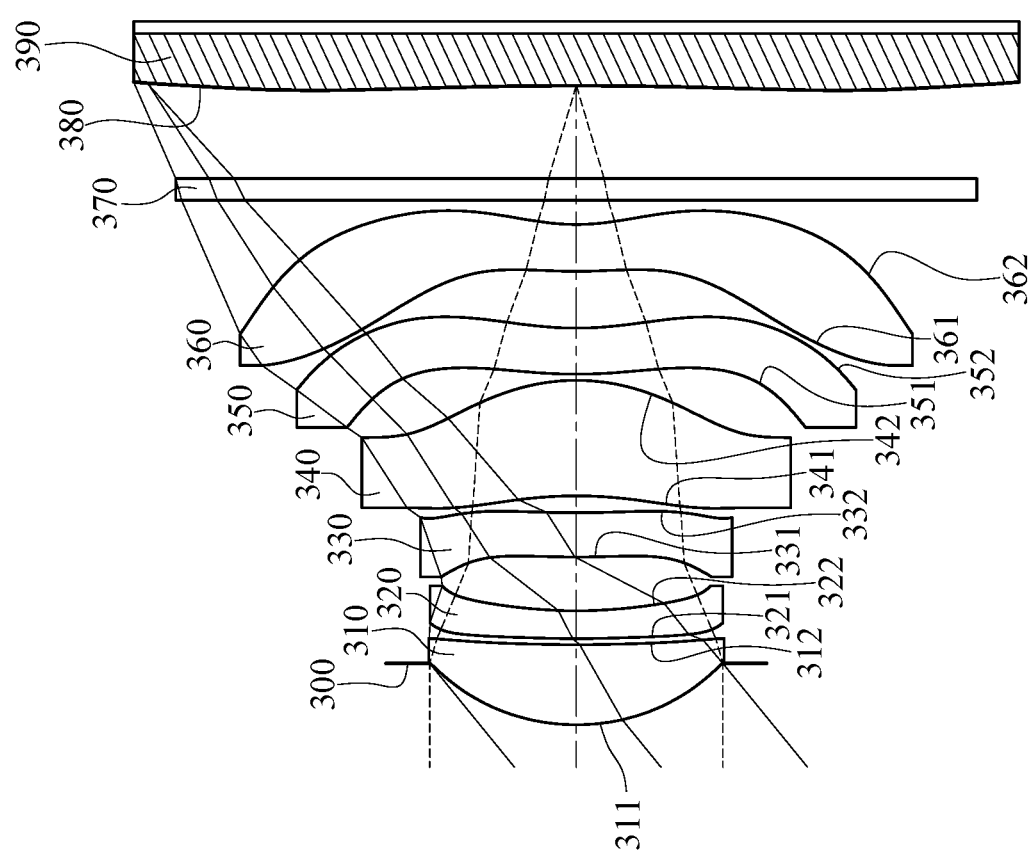
FIG. 7 is a schematic view of an image capturing unit according to the 3rd embodiment of the present disclosure.
Figure 8:
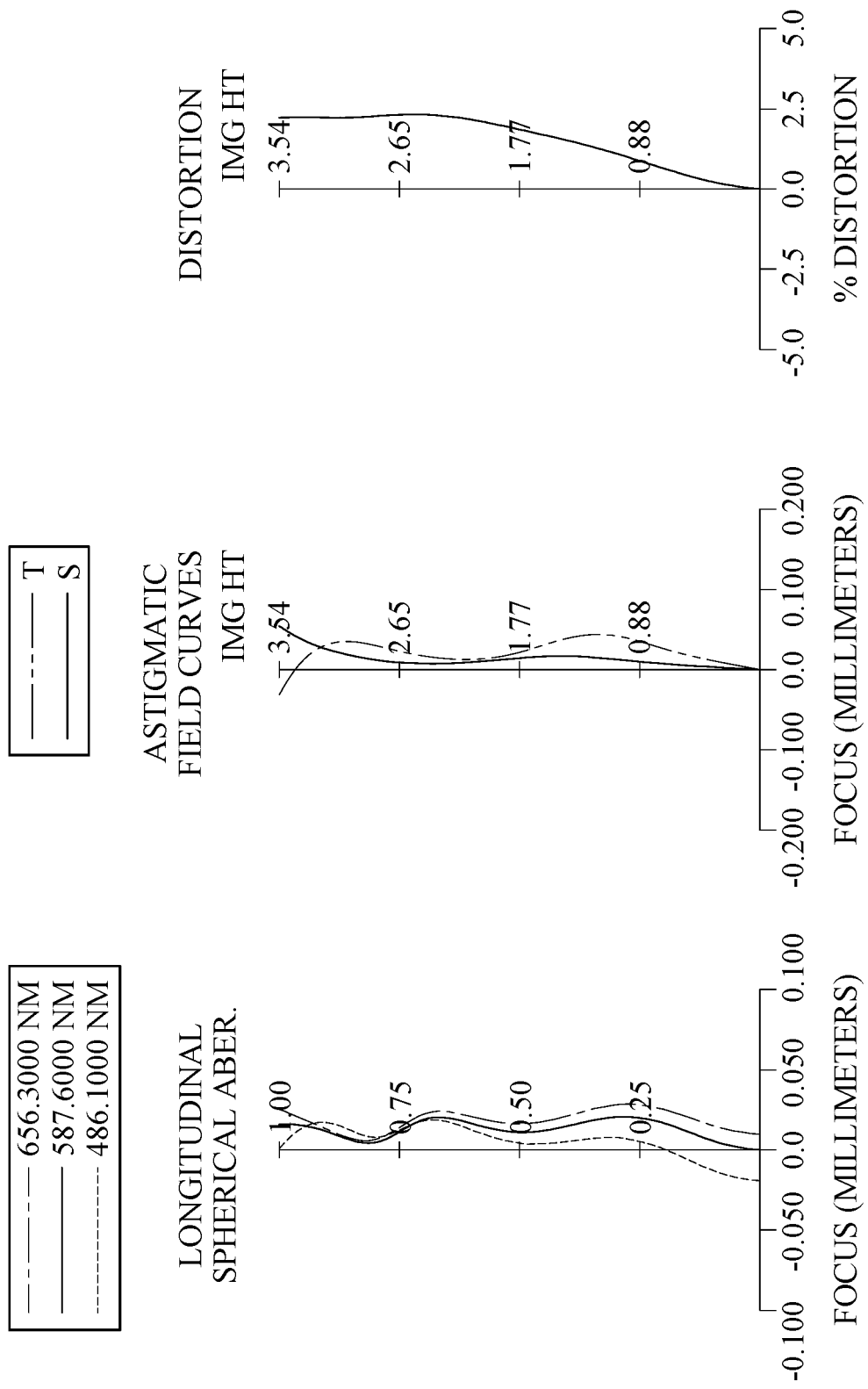
FIG. 8 shows spherical aberration curves, astigmatic field curves and a distortion curve of a first mode of the image capturing unit according to the 3rd embodiment.
Figure 9:
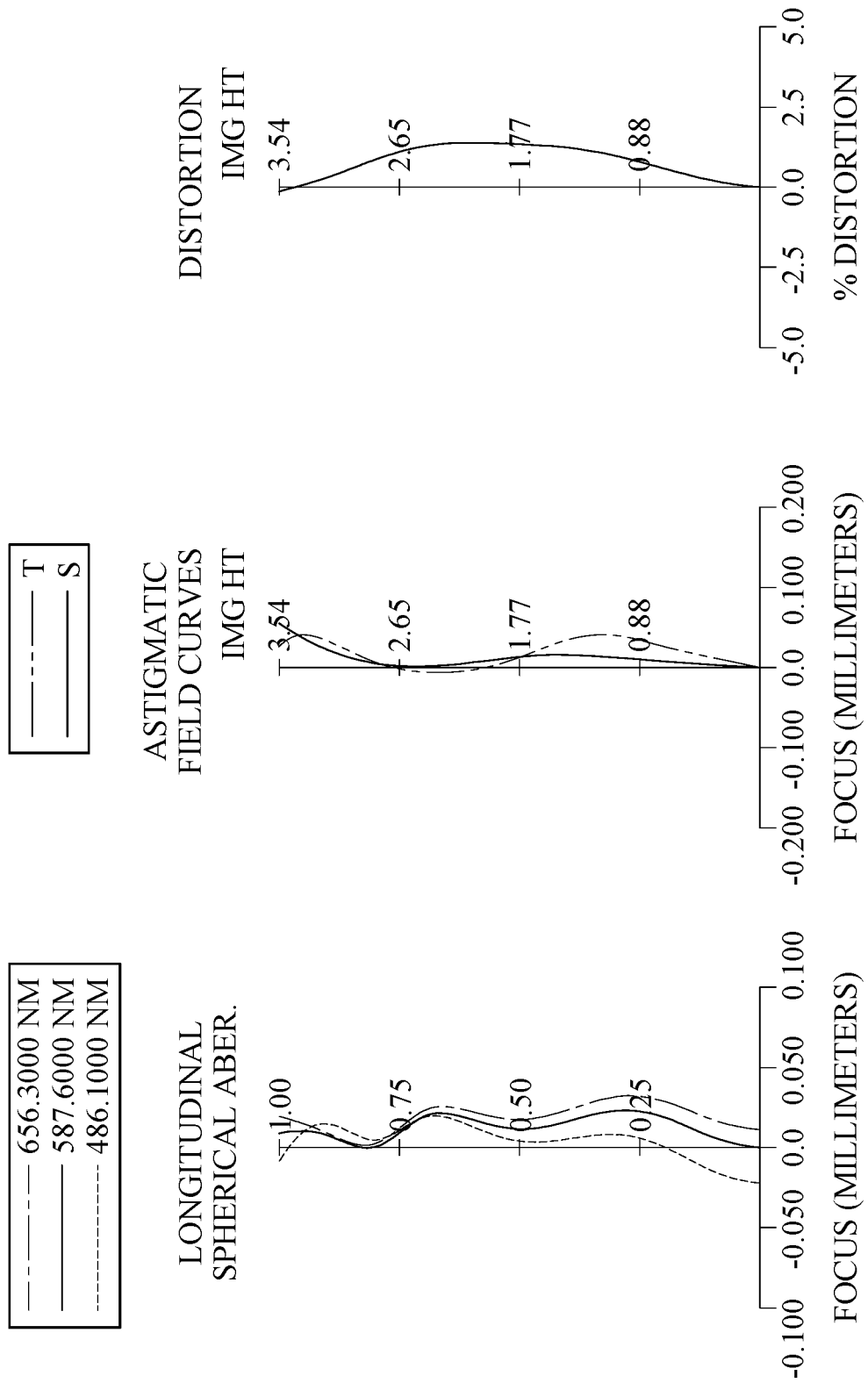
FIG. 9 shows spherical aberration curves, astigmatic field curves and a distortion curve of a second mode of the image capturing unit according to the 3rd embodiment.

FIG. 7 is a schematic view of an image capturing unit according to the 3rd embodiment of the present disclosure. FIG. 8 shows, in order from left to right, spherical aberration curves, astigmatic field curves and a distortion curve of a first mode of the image capturing unit according to the 3rd embodiment. FIG. 9 shows, in order from left to right, spherical aberration curves, astigmatic field curves and a distortion curve of a second mode of the image capturing unit according to the 3rd embodiment. In FIG. 7, the image capturing unit includes the photographing lens assembly (its reference numeral is omitted) of the present disclosure and an image sensor 390. The photographing lens assembly includes, in order from an object side to an image side, an aperture stop 300, a first lens element 310, a second lens element 320, a third lens element 330, a fourth lens element 340, a fifth lens element 350, a sixth lens element 360, a filter 370 and an image surface 380. The photographing lens assembly includes six single and non-cemented lens elements (310, 320, 330, 340, 350 and 360) with no additional lens element disposed between the first lens element 310 and the sixth lens element 360.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric.

The filter 370 is made of glass material and located between the sixth lens element 360 and the image surface 380, and will not affect the focal length of the photographing lens assembly.

The image surface 380 is concave in a paraxial region thereof, and the image surface 380 has at least one convex shape in an off-axis region thereof.

The image sensor 390 is disposed on or near the image surface 380 of the photographing lens assembly, and the image sensor 390 has at least one critical point and at least one inflection point in an off-axis region thereof.

The detailed optical data of the 3rd embodiment are shown in Table 7 and Table 8, and the aspheric surface data are shown in Table 9 below.

TABLE 7

1st Mode of 3rd Embodiment
f = 4.21 mm, Fno = 1.74, HFOV = 39.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.507 | | | | |
| 2 | Lens 1 | 1.724 (ASP) | 0.662 | Plastic | 1.544 | 55.9 | 3.72 |
| 3 | | 10.066 (ASP) | 0.050 | | | | |
| 4 | Lens 2 | 7.349 (ASP) | 0.230 | Plastic | 1.660 | 20.4 | −10.86 |
| 5 | | 3.584 (ASP) | 0.445 | | | | |
| 6 | Lens 3 | 7.505 (ASP) | 0.366 | Plastic | 1.660 | 20.4 | 141.52 |
| 7 | | 8.002 (ASP) | 0.140 | | | | |
| 8 | Lens 4 | −3.405 (ASP) | 0.955 | Plastic | 1.544 | 55.9 | 5.22 |
| 9 | | −1.701 (ASP) | 0.051 | | | | |
| 10 | Lens 5 | 3.826 (ASP) | 0.381 | Plastic | 1.639 | 23.3 | −18.57 |
| 11 | | 2.781 (ASP) | 0.469 | | | | |
| 12 | Lens 6 | 4.065 (ASP) | 0.387 | Plastic | 1.515 | 56.5 | −6.10 |
| 13 | | 1.715 (ASP) | 0.200 | | | | |
| 14 | Filter | Plano | 0.180 | Glass | 1.517 | 64.2 | — |
| 15 | | Plano | 0.768 | | | | |
| 16 | Image | −34.479 (ASP) | — | | | | |

Note:
Reference wavelength is 587.6 nm (d-line).

The definitions of these parameters shown in the following table are the same as those stated in the 1st embodiment with corresponding values for the 3rd embodiment, so an explanation in this regard will not be provided again.

Moreover, these parameters can be calculated from Table 7 and Table 9 as the following values and satisfy the following conditions:

| 1st Mode of 3rd Embodiment | | | |
|---|---|---|---|
| f [mm] | 4.21 | |(10 × SAGI)/f| | 0.07 |
| Fno | 1.74 | |(10 × SAGI)/Ri| | 0.009 |
| HFOV [deg.] | 39.2 | |SAGI0.8/SAGI0.4| | 0.60 |
| tan(HFOV) | 0.82 | TL [mm] | 5.28 |
| Obj [mm] | Infinity | TL/ImgH | 1.49 |
| Imd [mm] | 0.768 | Nmax | 1.660 |
| CTmax [mm] | 0.96 | Ypl/f | 0.32 |
| CTmin [mm] | 0.23 | Ycl/f | 0.52 |
| |k| + Σ|Ai| | 36.63 | |YcLr/Ycl| | 0.50 |
| ΣAT/ΣCT | 0.39 | |(CRA − MRA)/CRA| | 0.19 |
| (R1 + R2)/(R1 − R2) | −1.41 | | 0.27 |
| (RLf + RLr)/(RLf − RLr) | 2.46 | |(CRH − MRH) × 10| [mm] | 1.17 |

-continued

| 1st Mode of 3rd Embodiment | | | |
|---|---|---|---|
| |f/Ri| | 0.12 | | 0.07 |
| Ri/RLr | −20.11 | |DIST| | 2.34% |
| BL/f | 0.27 | N | 6 |

TABLE 8

2nd Mode of 3rd Embodiment
f = 4.21 mm, Fno = 1.84, HFOV = 38.3 deg.

| Surface # | | Curvature Radius | Thickness | Material | Index | Abbe # | Focal Length |
|---|---|---|---|---|---|---|---|
| 0 | Object | Plano | 100.000 | | | | |
| 1 | Ape. Stop | Plano | −0.507 | | | | |
| 2 | Lens 1 | 1.724 (ASP) | 0.662 | Plastic | 1.544 | 55.9 | 3.72 |
| 3 | | 10.066 (ASP) | 0.050 | | | | |
| 4 | Lens 2 | 7.349 (ASP) | 0.230 | Plastic | 1.660 | 20.4 | −10.86 |
| 5 | | 3.584 (ASP) | 0.445 | | | | |
| 6 | Lens 3 | 7.505 (ASP) | 0.366 | Plastic | 1.660 | 20.4 | 141.52 |
| 7 | | 8.002 (ASP) | 0.140 | | | | |
| 8 | Lens 4 | −3.405 (ASP) | 0.955 | Plastic | 1.544 | 55.9 | 5.22 |
| 9 | | −1.701 (ASP) | 0.051 | | | | |
| 10 | Lens 5 | 3.826 (ASP) | 0.381 | Plastic | 1.639 | 23.3 | −18.57 |
| 11 | | 2.781 (ASP) | 0.469 | | | | |
| 12 | Lens 6 | 4.065 (ASP) | 0.387 | Plastic | 1.515 | 56.5 | −6.10 |
| 13 | | 1.715 (ASP) | 0.200 | | | | |

TABLE 8-continued

2nd Mode of 3rd Embodiment
f = 4.21 mm, Fno = 1.84, HFOV = 38.3 deg.

| Surface # | | Curvature Radius | Thickness | Material | Index | Abbe # | Focal Length |
|---|---|---|---|---|---|---|---|
| 14 | Filter | Plano | 0.180 | Glass | 1.517 | 64.2 | — |
| 15 | | Plano | 0.948 | | | | |
| 16 | Image | −34.479 (ASP) | — | | | | |

Note:
Reference wavelength is 587.6 nm (d-line).

The definitions of these parameters shown in the following table are the same as those stated in the 1st embodiment with corresponding values for the 3rd embodiment, so an explanation in this regard will not be provided again.

Moreover, these parameters can be calculated from Table 8 and Table 9 as the following values and satisfy the following conditions:

| 2nd Mode of 3rd Embodiment | | | |
|---|---|---|---|
| f [mm] | 4.21 | |(10 × SAGI)/f| | 0.13 |
| Fno | 1.84 | |(10 × SAGI)/Ri| | 0.016 |
| HFOV [deg.] | 38.3 | |SAGI0.8/SAGI0.4| | 0.31 |
| tan(HFOV) | 0.79 | TL [mm] | 5.46 |
| Obj [mm] | 100.00 | TL/ImgH | 1.54 |
| Imd [mm] | 0.948 | Nmax | 1.660 |
| CTmax [mm] | 0.96 | Ypl/f | 0.32 |
| CTmin [mm] | 0.23 | Ycl/f | 0.52 |
| |k| + Σ|Ai| | 36.63 | |YcLr/Ycl| | 0.50 |
| ΣAT/ΣCT | 0.39 | |(CRA − MRA)/CRA| | 0.04 |
| (R1 + R2)/(R1 − R2) | −1.41 | | 0.28 |
| (RLf + RLr)/(RLf − RLr) | 2.46 | |(CRH − MRH) × 10| [mm] | 2.68 |
| |f/Ri| | 0.12 | | 0.12 |
| Ri/RLr | −20.11 | |DIST| | 0.13% |
| BL/f | 0.32 | N | 6 |

In the 3rd embodiment, the equation of the aspheric surface profiles of the aforementioned lens elements is the same as the equation of the 1st embodiment.

TABLE 9

Aspheric Coefficients

| Surface # | 2 | 3 | 4 | 5 | 6 |
|---|---|---|---|---|---|
| k = | 7.8877E−02 | 1.8107E+01 | −8.2904E+01 | −2.0098E+01 | −4.3728E+01 |
| A4 = | −2.2504E−03 | −9.1792E−02 | −1.1709E−01 | −3.5611E−02 | −1.4748E−01 |
| A6 = | 3.0501E−02 | 1.8969E−01 | 2.4531E−01 | 1.3457E−01 | 2.5272E−01 |
| A8 = | −5.8343E−02 | −1.6622E−01 | −2.0314E−01 | −2.0645E−01 | −1.1561E+00 |
| A10 = | 5.5995E−02 | 4.1721E−02 | 3.9206E−02 | 2.2763E−01 | 2.4097E+00 |
| A12 = | −1.9710E−02 | 2.0735E−02 | 4.0670E−02 | −1.5917E−01 | −2.8400E+00 |
| A14 = | — | −1.0147E−02 | −1.3174E−02 | 6.2543E−02 | 1.7625E+00 |
| A16 = | — | — | — | — | −4.3629E−01 |

| Surface # | 7 | 8 | 9 | 10 | 11 |
|---|---|---|---|---|---|
| k = | −1.9442E+01 | −7.9740E+00 | −1.3593E+00 | −4.3392E+00 | −3.8940E+00 |
| A4 = | −7.8259E−02 | 6.3352E−03 | −2.9856E−02 | −1.0114E+00 | −2.2121E+00 |
| A6 = | 5.8782E−02 | 2.6959E−02 | 5.7297E−02 | 5.0922E−01 | 1.2199E+00 |
| A8 = | −1.9182E−01 | 6.5647E−03 | −6.5748E−02 | 2.4198E−01 | 4.0953E+00 |
| A10 = | 2.6412E−01 | −9.7231E−03 | 6.1037E−02 | −1.2091E+00 | −1.3797E+01 |
| A12 = | −1.9345E−01 | 1.5788E−03 | −2.7084E−02 | 6.8407E−01 | 1.8900E+01 |
| A14 = | 7.8660E−02 | — | 5.5514E−03 | — | −1.2653E+01 |
| A16 = | −1.2872E−02 | — | −4.3327E−04 | — | 3.3372E+00 |

| Surface # | 12 | 13 | 16 |
|---|---|---|---|
| k = | −8.2428E+01 | −9.8942E+00 | −3.6633E+01 |
| A4 = | −8.6863E+00 | −6.5118E+00 | 8.2712E−04 |
| A6 = | 1.6549E+01 | 1.8291E+00 | 2.7155E−05 |
| A8 = | −1.1767E+00 | −3.1335E+01 | 2.9288E−05 |
| A10 = | −3.5507E+01 | 3.1662E+01 | −4.1472E−06 |
| A12 = | 5.1837E+01 | −1.8402E+01 | 1.4556E−07 |
| A14 = | −3.1067E+01 | 4.3380E+00 | — |
| A16 = | 7.0249E+00 | 3.4092E−01 | — |

4th Embodiment

Figure 10:
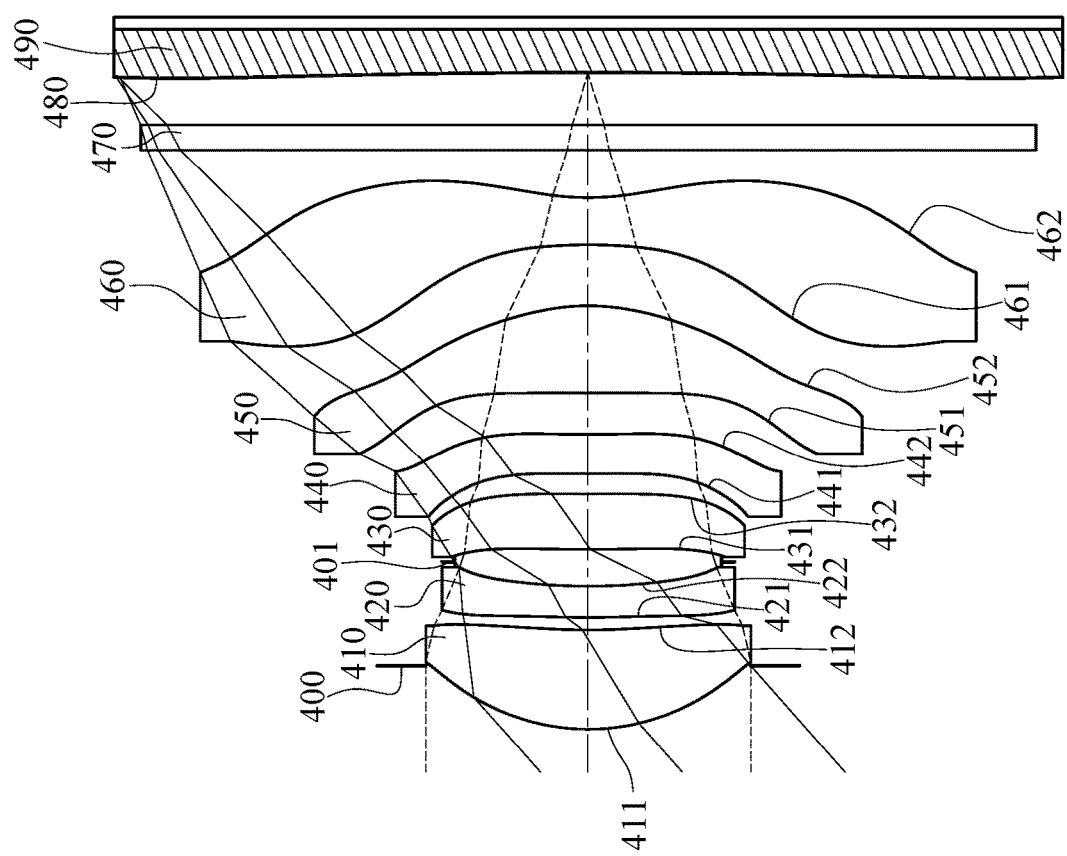
FIG. 10 is a schematic view of an image capturing unit according to the 4th embodiment of the present disclosure.
Figure 11:
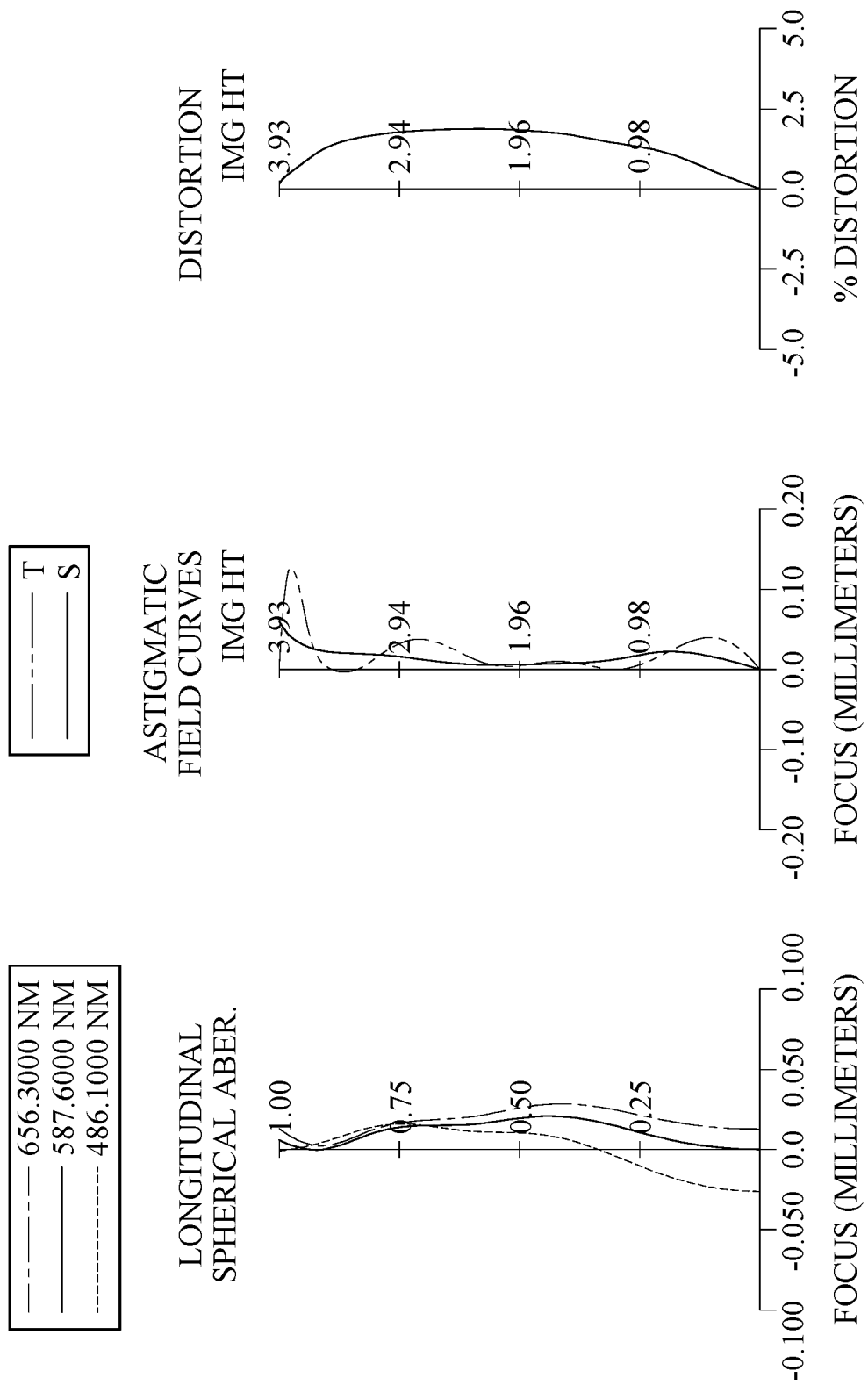
FIG. 11 shows spherical aberration curves, astigmatic field curves and a distortion curve of a first mode of the image capturing unit according to the 4th embodiment.
Figure 12:
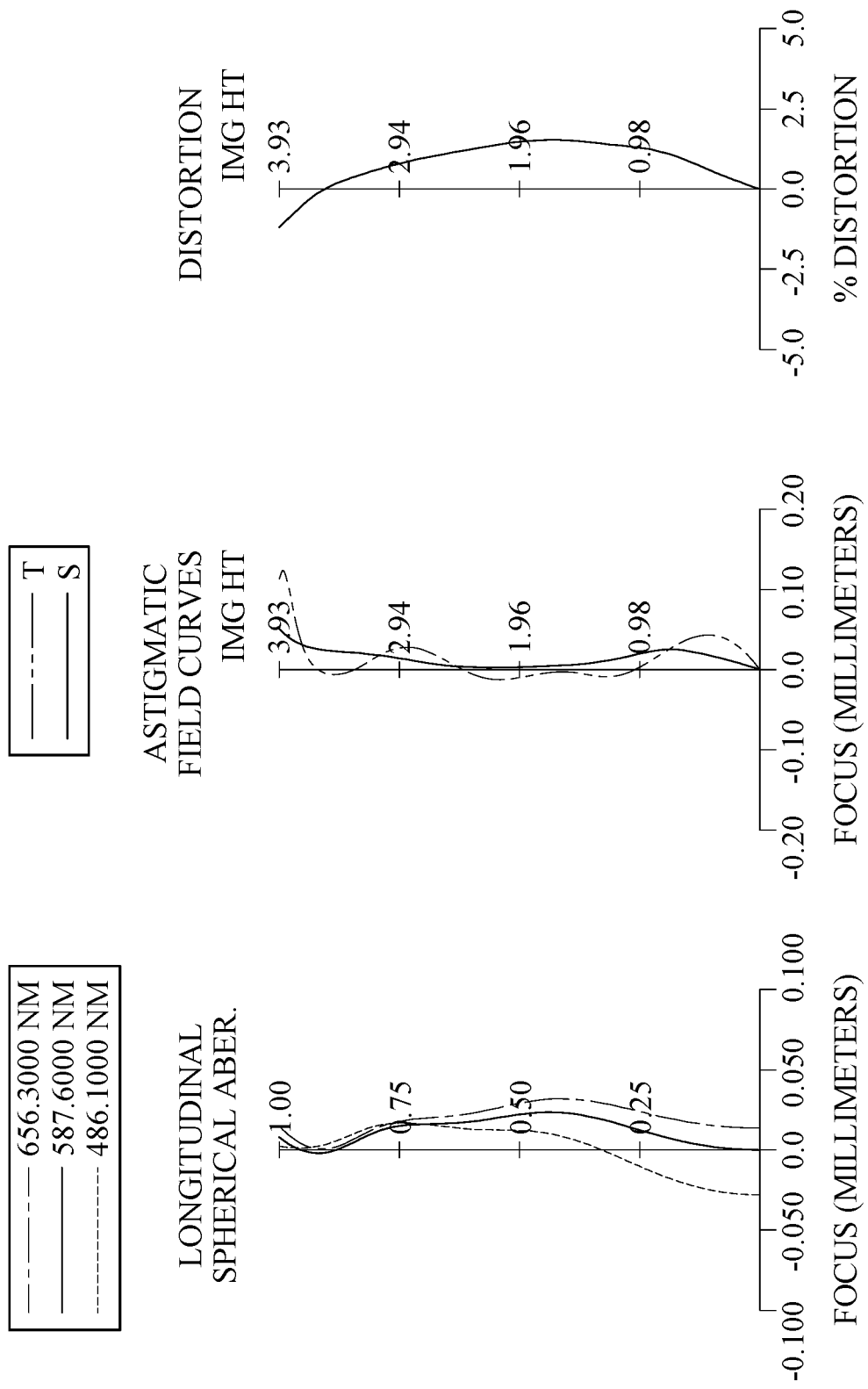
FIG. 12 shows spherical aberration curves, astigmatic field curves and a distortion curve of a second mode of the image capturing unit according to the 4th embodiment.

FIG. 10 is a schematic view of an image capturing unit according to the 4th embodiment of the present disclosure. FIG. 11 shows, in order from left to right, spherical aberration curves, astigmatic field curves and a distortion curve of a first mode of the image capturing unit according to the 4th embodiment. FIG. 12 shows, in order from left to right, spherical aberration curves, astigmatic field curves and a distortion curve of a second mode of the image capturing unit according to the 4th embodiment. In FIG. 10, the image capturing unit includes the photographing lens assembly (its reference numeral is omitted) of the present disclosure and an image sensor 490. The photographing lens assembly includes, in order from an object side to an image side, an aperture stop 400, a first lens element 410, a second lens element 420, a stop 401, a third lens element 430, a fourth lens element 440, a fifth lens element 450, a sixth lens element 460, a filter 470 and an image surface 480. The photographing lens assembly includes six single and non-cemented lens elements (410, 420, 430, 440, 450 and 460) with no additional lens element disposed between the first lens element 410 and the sixth lens element 460.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric.

The filter 470 is made of glass material and located between the sixth lens element 460 and the image surface 480, and will not affect the focal length of the photographing lens assembly.

The image surface 480 is concave in a paraxial region thereof, and the image surface 480 has at least one convex shape in an off-axis region thereof.

The image sensor 490 is disposed on or near the image surface 480 of the photographing lens assembly, and the image sensor 490 has at least one critical point and at least one inflection point in an off-axis region thereof.

The detailed optical data of the 4th embodiment are shown in Table 10 and Table 11, and the aspheric surface data are shown in Table 12 below.

TABLE 10

1st Mode of 4th Embodiment
f = 4.46 mm, Fno = 1.65, HFOV = 41.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.530 | | | | |
| 2 | Lens 1 | 1.831 | (ASP) | 0.827 | Plastic | 1.545 | 56.1 | 4.73 |
| 3 | | 5.323 | (ASP) | 0.103 | | | | |
| 4 | Lens 2 | 7.171 | (ASP) | 0.261 | Plastic | 1.661 | 20.3 | −16.39 |
| 5 | | 4.252 | (ASP) | 0.204 | | | | |
| 6 | Stop | Plano | | 0.103 | | | | |
| 7 | Lens 3 | 12.360 | (ASP) | 0.461 | Plastic | 1.544 | 56.0 | 31.25 |
| 8 | | 44.670 | (ASP) | 0.169 | | | | |
| 9 | Lens 4 | 15.184 | (ASP) | 0.330 | Plastic | 1.661 | 20.3 | −34.64 |
| 10 | | 9.048 | (ASP) | 0.344 | | | | |
| 11 | Lens 5 | −290.562 | (ASP) | 0.727 | Plastic | 1.544 | 56.0 | 3.21 |
| 12 | | −1.735 | (ASP) | 0.509 | | | | |
| 13 | Lens 6 | −4.756 | (ASP) | 0.390 | Plastic | 1.544 | 56.0 | −2.59 |
| 14 | | 2.057 | (ASP) | 0.400 | | | | |
| 15 | Filter | Plano | | 0.210 | Glass | 1.517 | 64.2 | — |
| 16 | | Plano | | 0.435 | | | | |
| 17 | Image | −92.732 | (ASP) | — | | | | |

Note:
Reference wavelength is 587.6 nm (d-line).
An effective radius of the stop 401 (Surface 6) is 1.110 mm.

The definitions of these parameters shown in the following table are the same as those stated in the 1st embodiment with corresponding values for the 4th embodiment, so an explanation in this regard will not be provided again.

Moreover, these parameters can be calculated from Table 10 and Table 12 as the following values and satisfy the following conditions:

| 1st Mode of 4th Embodiment | | | |
|---|---|---|---|
| f [mm] | 4.46 | |(10 × SAGI)/f| | 0.08 |
| Fno | 1.65 | |(10 × SAGI)/Ri| | 0.004 |
| HFOV [deg.] | 41.4 | |SAGI0.8/SAGI0.4| | 3.34 |
| tan(HFOV) | 0.88 | TL [mm] | 5.47 |
| Obj [mm] | Infinity | TL/ImgH | 1.39 |
| Imd [mm] | 0.435 | Nmax | 1.661 |
| CTmax [mm] | 0.83 | Ypl/f | 0.54 |
| CTmin [mm] | 0.26 | Ycl/f | 0.77 |
| |k| + Σ|Ai| | 7.31 | |YcLr/Ycl| | 0.37 |
| ΣAT/ΣCT | 0.48 | |(CRA − MRA)/CRA| | 0.30 |
| (R1 + R2)/(R1 − R2) | −2.05 | | 0.32 |
| (RLf + RLr)/(RLf − RLr) | 0.40 | |(CRH − MRH) × 10| [mm] | 0.33 |
| |f/Ri| | 0.05 | | 0.18 |
| Ri/RLr | −45.08 | |DIST| | 0.18% |
| BL/f | 0.23 | N | 6 |

Moreover, these parameters can be calculated from Table 11 and Table 12 as the following values and satisfy the following conditions:

| 2nd Mode of 4th Embodiment | | | |
|---|---|---|---|
| f [mm] | 4.46 | |(10 × SAGI)/f| | 0.08 |
| Fno | 1.72 | |(10 × SAGI)/Ri| | 0.004 |
| HFOV [deg.] | 40.9 | |SAGI0.8/SAGI0.4| | 3.34 |
| tan(HFOV) | 0.87 | TL [mm] | 5.57 |
| Obj [mm] | 200.00 | TL/ImgH | 1.42 |
| Imd [mm] | 0.532 | Nmax | 1.661 |
| CTmax [mm] | 0.83 | Ypl/f | 0.54 |
| CTmin [mm] | 0.26 | Ycl/f | 0.77 |
| |k| + Σ|Ai| | 7.31 | |YcLr/Ycl| | 0.37 |
| ΣAT/ΣCT | 0.48 | |(CRA − MRA)/CRA| | 0.23 |
| (R1 + R2)/(R1 − R2) | −2.05 | | 0.32 |
| (RLf + RLr)/(RLf − RLr) | 0.40 | |(CRH − MRH) × 10| [mm] | 0.01 |
| |f/Ri| | 0.05 | | 0.01 |
| Ri/RLr | −45.08 | |DIST| | 1.25% |
| BL/f | 0.26 | N | 6 |

TABLE 11

2nd Mode of 4th Embodiment
f = 4.46 mm, Fno = 1.72, HFOV = 40.9 deg.

| Surface # | | Curvature Radius | Thickness | Material | Index | Abbe # | Focal Length |
|---|---|---|---|---|---|---|---|
| 0 | Object | Plano | 200.000 | | | | |
| 1 | Ape. Stop | Plano | −0.530 | | | | |
| 2 | Lens 1 | 1.831 (ASP) | 0.827 | Plastic | 1.545 | 56.1 | 4.73 |
| 3 | | 5.323 (ASP) | 0.103 | | | | |
| 4 | Lens 2 | 7.171 (ASP) | 0.261 | Plastic | 1.661 | 20.3 | −16.39 |
| 5 | | 4.252 (ASP) | 0.204 | | | | |
| 6 | Stop | Plano | 0.103 | | | | |
| 7 | Lens 3 | 12.360 (ASP) | 0.461 | Plastic | 1.544 | 56.0 | 31.25 |
| 8 | | 44.670 (ASP) | 0.169 | | | | |
| 9 | Lens 4 | 15.184 (ASP) | 0.330 | Plastic | 1.661 | 20.3 | −34.64 |
| 10 | | 9.048 (ASP) | 0.344 | | | | |
| 11 | Lens 5 | −290.562 (ASP) | 0.727 | Plastic | 1.544 | 56.0 | 3.21 |
| 12 | | −1.735 (ASP) | 0.509 | | | | |
| 13 | Lens 6 | −4.756 (ASP) | 0.390 | Plastic | 1.544 | 56.0 | −2.59 |
| 14 | | 2.057 (ASP) | 0.400 | | | | |
| 15 | Filter | Plano | 0.210 | Glass | 1.517 | 64.2 | — |
| 16 | | Plano | 0.532 | | | | |
| 17 | Image | −92.732 (ASP) | — | | | | |

Note:
Reference wavelength is 587.6 nm (d-line).
An effective radius of the stop 401 (Surface 6) is 1.110 mm.

The definitions of these parameters shown in the following table are the same as those stated in the 1st embodiment with corresponding values for the 4th embodiment, so an explanation in this regard will not be provided again.

In the 4th embodiment, the equation of the aspheric surface profiles of the aforementioned lens elements is the same as the equation of the 1st embodiment.

TABLE 12

| Aspheric Coefficients | | | | | |
|---|---|---|---|---|---|
| Surface # | 2 | 3 | 4 | 5 | 7 |
| k = | −7.0097E−02 | −9.3099E+00 | 1.0015E+01 | 5.4744E+00 | 9.7463E+01 |
| A4 = | 5.4819E−03 | −9.3176E−02 | −1.6903E−01 | −1.0225E−01 | −7.1134E−02 |
| A6 = | −1.9030E−02 | 8.8848E−02 | 2.0802E−01 | 1.4217E−01 | 2.1934E−02 |
| A8 = | 3.9388E−02 | −5.2660E−02 | −1.2668E−01 | −5.5345E−02 | −3.7796E−02 |
| A10 = | −4.0358E−02 | 1.6442E−02 | 4.3860E−02 | −6.5578E−03 | 1.4651E−02 |
| A12 = | 2.0647E−02 | −3.0430E−03 | −5.6209E−03 | 1.4442E−02 | −2.3634E−03 |
| A14 = | −4.5985E−03 | — | — | — | — |

TABLE 12-continued

| Aspheric Coefficients | | | | | |
|---|---|---|---|---|---|
| Surface # | 8 | 9 | 10 | 11 | 12 |
| k = | 2.0000E+01 | −4.0281E+01 | −9.6661E+01 | −1.3250E+01 | −1.2466E+01 |
| A4 = | −8.5465E−02 | −1.6601E−01 | −1.0805E−01 | 1.9723E−02 | −1.0759E−01 |
| A6 = | −2.5268E−02 | 1.9830E−02 | −2.3028E−02 | −5.8518E−02 | 1.2460E−01 |
| A8 = | 1.4459E−01 | 2.2450E−02 | 5.4541E−02 | 4.5077E−03 | −1.1151E−01 |
| A10 = | −2.6146E−01 | 8.8645E−03 | −3.9852E−02 | 1.4819E−02 | 5.3704E−02 |
| A12 = | 2.0180E−01 | −7.2238E−02 | 1.5380E−02 | −8.7071E−03 | −1.3382E−02 |
| A14 = | −7.0870E−02 | 6.1659E−02 | −2.4864E−03 | 2.1240E−03 | 1.6612E−03 |
| A16 = | 8.9574E−03 | −1.5713E−02 | 1.0329E−04 | −1.9250E−04 | −8.2044E−05 |

| Surface # | 13 | 14 | 17 |
|---|---|---|---|
| k = | −1.4126E+00 | −1.0299E+01 | 7.3056E+00 |
| A4 = | −6.9515E−02 | −6.5927E−02 | −3.2313E−05 |
| A6 = | −1.1270E−02 | 1.9996E−02 | 6.1490E−06 |
| A8 = | 1.7099E−02 | −4.3139E−03 | 6.9054E−07 |
| A10 = | −4.6709E−03 | 6.3686E−04 | −1.0369E−08 |
| A12 = | 5.9681E−04 | −6.4667E−05 | — |
| A14 = | −3.7849E−05 | 4.0124E−06 | — |
| A16 = | 9.6286E−07 | −1.0840E−07 | — |

5th Embodiment

Figure 13:
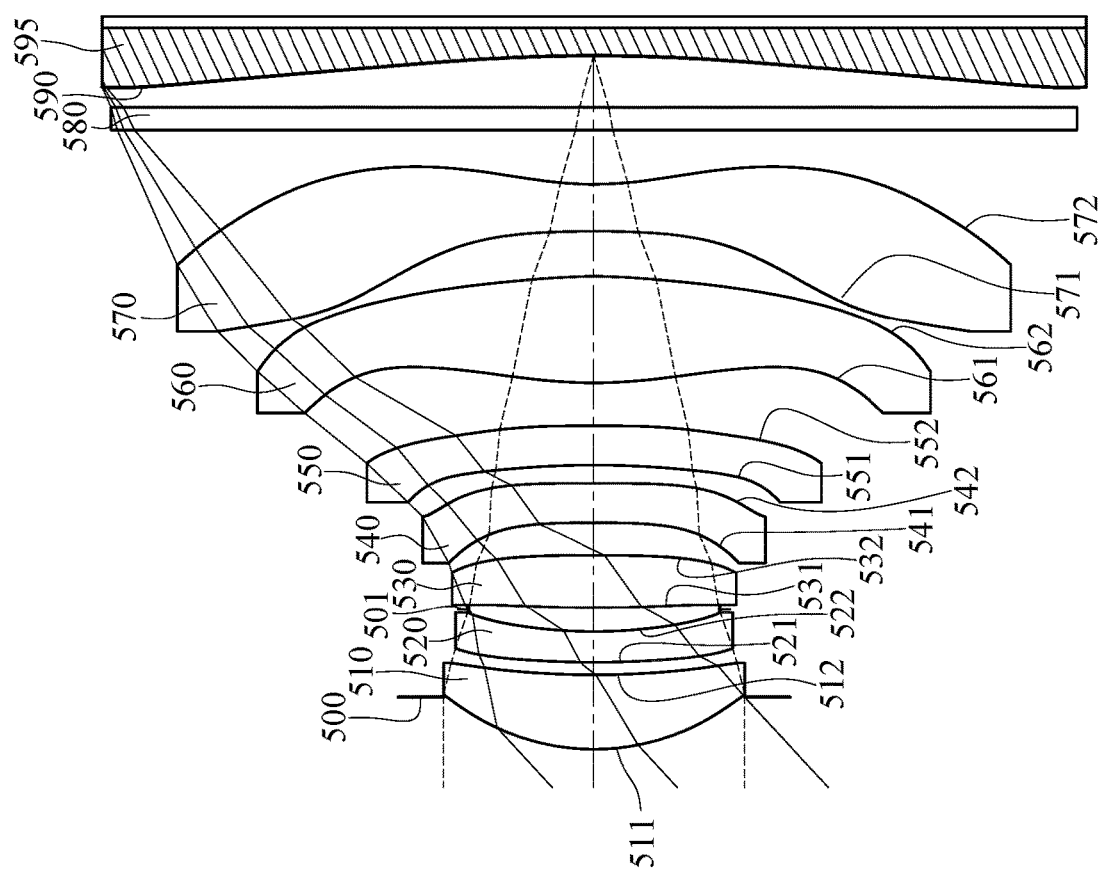
FIG. 13 is a schematic view of an image capturing unit according to the 5th embodiment of the present disclosure.
Figure 14:
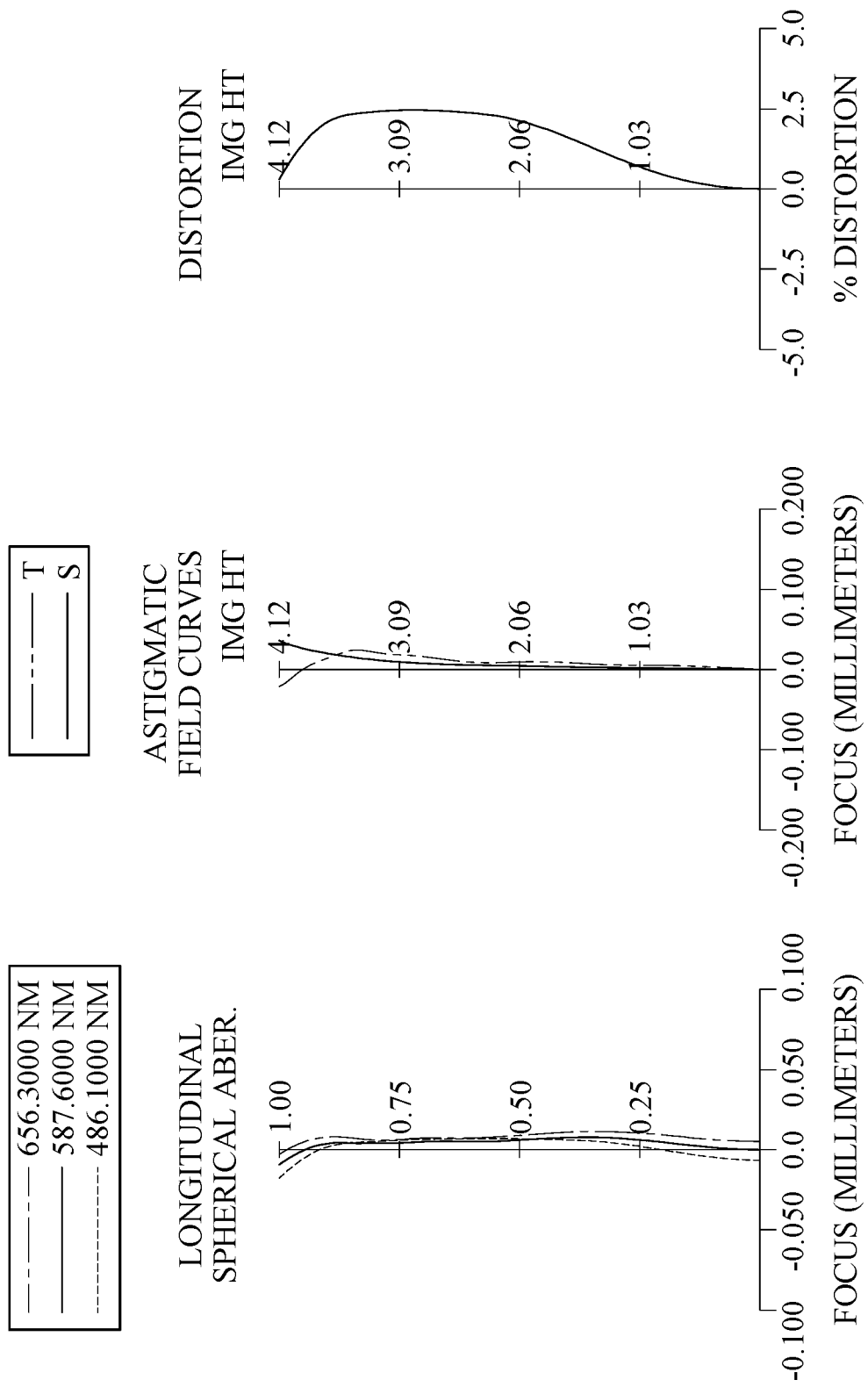
FIG. 14 shows spherical aberration curves, astigmatic field curves and a distortion curve of a first mode of the image capturing unit according to the 5th embodiment.
Figure 15:
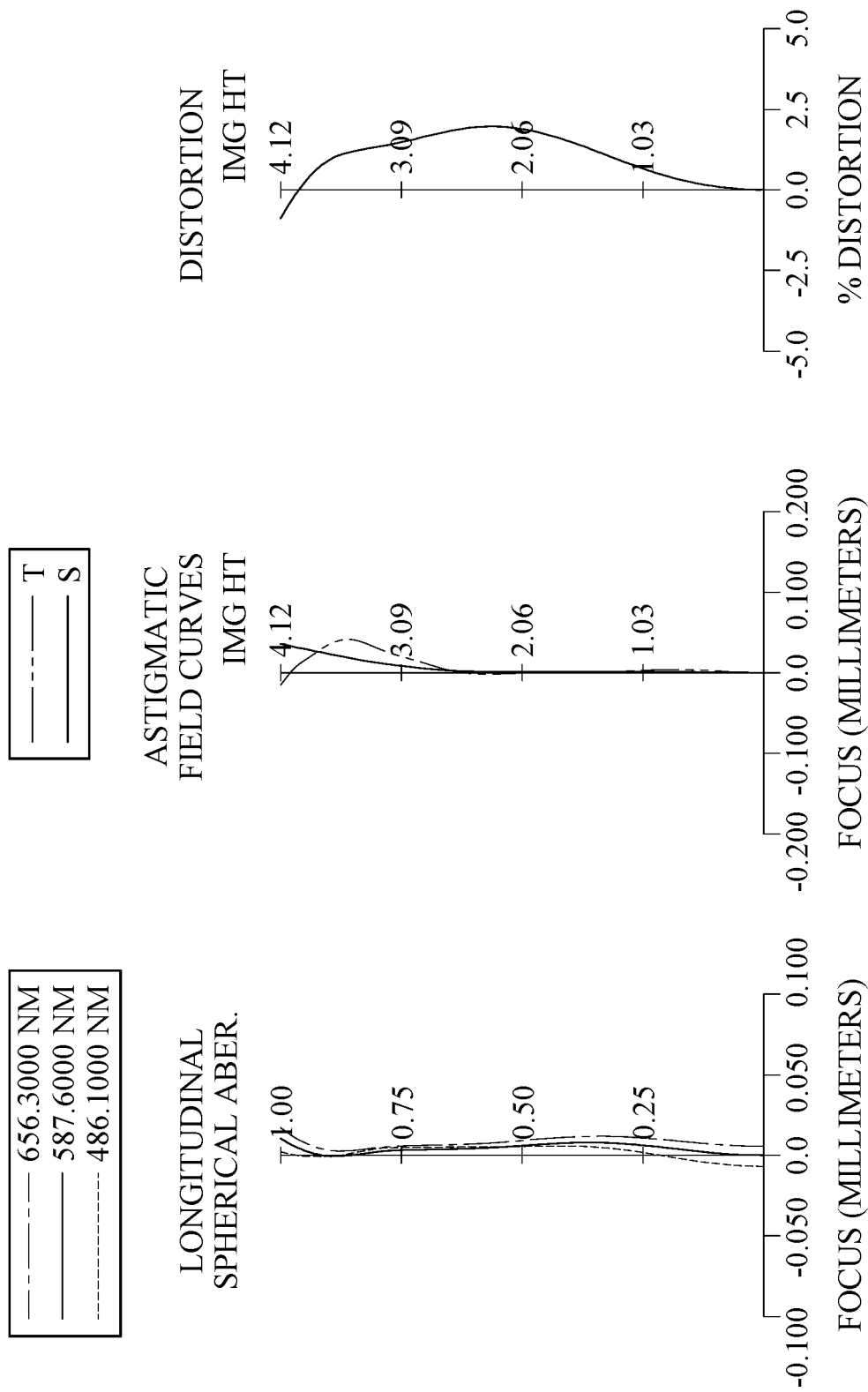
FIG. 15 shows spherical aberration curves, astigmatic field curves and a distortion curve of a second mode of the image capturing unit according to the 5th embodiment.

FIG. 13 is a schematic view of an image capturing unit according to the 5th embodiment of the present disclosure. FIG. 14 shows, in order from left to right, spherical aberration curves, astigmatic field curves and a distortion curve of a first mode of the image capturing unit according to the 5th embodiment. FIG. 15 shows, in order from left to right, spherical aberration curves, astigmatic field curves and a distortion curve of a second mode of the image capturing unit according to the 5th embodiment. In FIG. 13, the image capturing unit includes the photographing lens assembly (its reference numeral is omitted) of the present disclosure and an image sensor 595. The photographing lens assembly includes, in order from an object side to an image side, an aperture stop 500, a first lens element 510, a second lens element 520, a stop 501, a third lens element 530, a fourth lens element 540, a fifth lens element 550, a sixth lens element 560, a seventh lens element 570, a filter 580 and an image surface 590. The photographing lens assembly includes seven single and non-cemented lens elements (510, 520, 530, 540, 550, 560 and 570) with no additional lens element disposed between the first lens element 510 and the seventh lens element 570.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric.

The seventh lens element 570 with negative refractive power has an object-side surface 571 being concave in a paraxial region thereof and an image-side surface 572 being concave in a paraxial region thereof. The seventh lens element 570 is made of plastic material and has the object-side surface 571 and the image-side surface 572 being both aspheric.

The filter 580 is made of glass material and located between the seventh lens element 570 and the image surface 590, and will not affect the focal length of the photographing lens assembly.

The image surface 590 is concave in a paraxial region thereof, and the image surface 590 has at least one convex shape in an off-axis region thereof.

The image sensor 595 is disposed on or near the image surface 590 of the photographing lens assembly, and the image sensor 595 has at least one critical point and at least one inflection point in an off-axis region thereof.

The detailed optical data of the 5th embodiment are shown in Table 13 and Table 14, and the aspheric surface data are shown in Table 15 below.

TABLE 13

1st Mode of 5th Embodiment
f = 4.62 mm, Fno = 1.80, HFOV = 42.7 deg.

| Surface # | | Curvature Radius | | Thickness | Material | Index | Abbe # | Focal Length |
|---|---|---|---|---|---|---|---|---|
| 0 | Object | Plano | | 100000.000 | | | | |
| 1 | Ape. Stop | Plano | | −0.438 | | | | |
| 2 | Lens 1 | 1.943 | (ASP) | 0.625 | Plastic | 1.545 | 56.0 | 4.80 |
| 3 | | 6.735 | (ASP) | 0.104 | | | | |
| 4 | Lens 2 | 6.846 | (ASP) | 0.260 | Plastic | 1.669 | 19.5 | −13.69 |
| 5 | | 3.858 | (ASP) | 0.188 | | | | |
| 6 | Stop | Plano | | 0.015 | | | | |
| 7 | Lens 3 | 9.084 | (ASP) | 0.443 | Plastic | 1.544 | 56.0 | 12.36 |
| 8 | | −25.418 | (ASP) | 0.272 | | | | |
| 9 | Lens 4 | −15.894 | (ASP) | 0.330 | Plastic | 1.669 | 19.5 | −26.76 |
| 10 | | −143.148 | (ASP) | 0.154 | | | | |
| 11 | Lens 5 | −8.584 | (ASP) | 0.330 | Plastic | 1.584 | 28.2 | −17.64 |
| 12 | | −52.142 | (ASP) | 0.361 | | | | |
| 13 | Lens 6 | 3.892 | (ASP) | 0.898 | Plastic | 1.544 | 56.0 | 3.90 |
| 14 | | −4.278 | (ASP) | 0.379 | | | | |
| 15 | Lens 7 | −10.068 | (ASP) | 0.395 | Plastic | 1.544 | 56.0 | −3.86 |
| 16 | | 2.691 | (ASP) | 0.455 | | | | |
| 17 | Filter | Plano | | 0.190 | Glass | 1.517 | 64.2 | — |
| 18 | | Plano | | 0.436 | | | | |
| 19 | Image | −13.136 | (ASP) | — | | | | |

Note:
Reference wavelength is 587.6 nm (d-line).
An effective radius of the stop 501 (Surface 6) is 1.055 mm.

The definitions of these parameters shown in the following table are the same as those stated in the 1st embodiment with corresponding values for the 5th embodiment, so an explanation in this regard will not be provided again.

Moreover, these parameters can be calculated from Table 13 and Table 15 as the following values and satisfy the following conditions:

1st Mode of 5th Embodiment

| f [mm] | 4.62 | |(10 × SAGI)/f| | 0.57 |
|---|---|---|---|
| Fno | 1.80 | |(10 × SAGI)/Ri| | 0.201 |
| HFOV [deg.] | 42.7 | |SAGI0.8/SAGI0.4| | 2.67 |
| tan(HFOV) | 0.92 | TL [mm] | 5.83 |

1st Mode of 5th Embodiment

| Obj [mm] | 100000.00 | TL/ImgH | 1.42 |
|---|---|---|---|
| Imd [mm] | 0.436 | Nmax | 1.669 |
| CTmax [mm] | 0.90 | Ypl/f | 0.44 |
| CTmin [mm] | 0.26 | Ycl/f | 0.86 |
| |k| + Σ|Ai| | 57.63 | |YcLr/Ycl| | 0.38 |
| ΣAT/ΣCT | 0.45 | |(CRA − MRA)/CRA| | 0.19 |
| (R1 + R2)/(R1 − R2) | −1.81 | | 0.25 |
| (RLf + RLr)/(RLf − RLr) | 0.58 | |(CRH − MRH) × 10| | 0.13 |
| |f/Ri| | 0.35 | [mm] | 0.28 |
| Ri/RLr | −4.88 | |DIST| | 0.32% |
| BL/f | 0.23 | N | 7 |

TABLE 14

2nd Mode of 5th Embodiment
f = 4.62 mm, Fno = 1.92, HFOV = 42.2 deg.

| Surface # | | Curvature Radius | | Thickness | Material | Index | Abbe # | Focal Length |
|---|---|---|---|---|---|---|---|---|
| 0 | Object | Plano | | 200.000 | | | | |
| 1 | Ape. Stop | Plano | | −0.438 | | | | |
| 2 | Lens 1 | 1.943 | (ASP) | 0.625 | Plastic | 1.545 | 56.0 | 4.80 |
| 3 | | 6.735 | (ASP) | 0.104 | | | | |
| 4 | Lens 2 | 6.846 | (ASP) | 0.260 | Plastic | 1.669 | 19.5 | −13.69 |
| 5 | | 3.858 | (ASP) | 0.188 | | | | |
| 6 | Stop | Plano | | 0.015 | | | | |
| 7 | Lens 3 | 9.084 | (ASP) | 0.443 | Plastic | 1.544 | 56.0 | 12.36 |
| 8 | | −25.418 | (ASP) | 0.272 | | | | |
| 9 | Lens 4 | −15.894 | (ASP) | 0.330 | Plastic | 1.669 | 19.5 | −26.76 |
| 10 | | −143.148 | (ASP) | 0.154 | | | | |
| 11 | Lens 5 | −8.584 | (ASP) | 0.330 | Plastic | 1.584 | 28.2 | −17.64 |
| 12 | | −52.142 | (ASP) | 0.361 | | | | |
| 13 | Lens 6 | 3.892 | (ASP) | 0.898 | Plastic | 1.544 | 56.0 | 3.90 |
| 14 | | −4.278 | (ASP) | 0.379 | | | | |
| 15 | Lens 7 | −10.068 | (ASP) | 0.395 | Plastic | 1.544 | 56.0 | −3.86 |
| 16 | | 2.691 | (ASP) | 0.455 | | | | |
| 17 | Filter | Plano | | 0.190 | Glass | 1.517 | 64.2 | — |

TABLE 14-continued

2nd Mode of 5th Embodiment
f = 4.62 mm, Fno = 1.92, HFOV = 42.2 deg.

| Surface # | | Curvature Radius | | Thickness | Material | Index | Abbe # | Focal Length |
|---|---|---|---|---|---|---|---|---|
| 18 | | Plano | | 0.542 | | | | |
| 19 | Image | −13.136 | (ASP) | | — | | | |

Note:
Reference wavelength is 587.6 nm (d-line).
An effective radius of the stop 501 (Surface 6) is 1.055 mm.

The definitions of these parameters shown in the following table are the same as those stated in the 1st embodiment with corresponding values for the 5th embodiment, so an explanation in this regard will not be provided again.

Moreover, these parameters can be calculated from Table 14 and Table 15 as the following values and satisfy the following conditions:

| 2nd Mode of 5th Embodiment | | | |
|---|---|---|---|
| f [mm] | 4.62 | |(10 × SAGI)/f| | 0.57 |
| Fno | 1.92 | |(10 × SAGI)/Ri| | 0.202 |
| HFOV [deg.] | 42.2 | |SAGI0.8/SAGI0.4| | 2.67 |
| tan(HFOV) | 0.91 | TL [mm] | 5.94 |
| Obj [mm] | 200.00 | TL/ImgH | 1.44 |
| Imd [mm] | 0.542 | Nmax | 1.669 |

-continued

| 2nd Mode of 5th Embodiment | | | |
|---|---|---|---|
| CTmax [mm] | 0.90 | Ypl/f | 0.44 |
| CTmin [mm] | 0.26 | Ycl/f | 0.86 |
| |k| + Σ|Ai| | 57.63 | |YcLr/Ycl| | 0.38 |
| ΣAT/ΣCT | 0.45 | |(CRA − MRA)/CRA| | 0.19 |
| (R1 + R2)/(R1 − R2) | −1.81 | | 0.26 |
| (RLf + RLr)/(RLf − RLr) | 0.58 | |(CRH − MRH) × 10| [mm] | 0.12 |
| |f/Ri| | 0.35 | | 0.11 |
| Ri/RLr | −4.88 | |DIST| | 0.92% |
| BL/f | 0.26 | N | 7 |

In the 5th embodiment, the equation of the aspheric surface profiles of the aforementioned lens elements is the same as the equation of the 1st embodiment.

TABLE 15

Aspheric Coefficients

| Surface # | 2 | 3 | 4 | 5 | 7 |
|---|---|---|---|---|---|
| k = | −5.9586E−01 | 1.0521E+01 | 7.0579E+00 | −9.9199E−01 | 1.5575E+01 |
| A4 = | 1.2124E−02 | −3.7928E−02 | −6.8016E−02 | −4.9792E−02 | −4.7624E−02 |
| A6 = | −1.3807E−03 | 6.2014E−02 | 1.2128E−01 | 8.6261E−02 | 3.4940E−02 |
| A8 = | 1.0036E−02 | −3.6744E−02 | −6.9623E−02 | −2.0432E−02 | −3.2235E−02 |
| A10 = | −1.1426E−02 | −1.0021E−02 | −1.7459E−02 | −5.3470E−02 | 2.6920E−02 |
| A12 = | 6.2425E−03 | 1.8559E−02 | 4.1194E−02 | 5.0450E−02 | −2.9859E−02 |
| A14 = | −1.8111E−03 | −5.6930E−03 | −1.2546E−02 | −9.0732E−03 | 1.4182E−02 |

| Surface # | 8 | 9 | 10 | 11 | 12 |
|---|---|---|---|---|---|
| k = | 4.7765E+01 | 1.8282E+01 | −9.9000E+01 | −9.9000E+01 | −9.9000E+01 |
| A4 = | −5.4246E−02 | −1.1489E−01 | −2.5408E−01 | −3.4386E−01 | −1.0758E−01 |
| A6 = | −1.0599E−04 | −1.9936E−02 | −1.0767E−01 | 1.4876E+00 | 8.7446E−02 |
| A8 = | 2.5595E−02 | −1.8577E−02 | −3.1907E−01 | −3.5109E+00 | −3.6398E−02 |
| A10 = | −3.4471E−02 | 7.8903E−02 | 1.3449E+00 | 4.4801E+00 | 1.0093E−02 |
| A12 = | 1.3039E−02 | −7.5308E−02 | −1.9062E+00 | −3.4792E+00 | −2.7835E−03 |
| A14 = | −1.8397E−03 | 2.2430E−02 | 9.6973E−01 | 1.1281E+00 | 6.0291E−04 |
| A16 = | — | — | — | — | −5.7217E−05 |

| Surface # | 13 | 14 | 15 | 16 | 19 |
|---|---|---|---|---|---|
| k = | 2.5610E−01 | −1.4580E+00 | 3.9194E+00 | −1.1197E+01 | −5.7628E+01 |
| A4 = | −1.6640E+00 | 7.7350E−02 | −3.4905E−02 | −3.9696E−02 | 2.4633E−04 |
| A6 = | 5.1358E−01 | −5.4294E−02 | −1.0322E−02 | 8.8729E−03 | 8.5966E−05 |
| A8 = | 5.0980E+00 | 2.1683E−02 | 7.4403E−03 | −1.3334E−03 | −1.1579E−05 |
| A10 = | −1.7674E+01 | −5.1613E−03 | −1.4741E−03 | 1.1321E−04 | 4.0232E−07 |
| A12 = | 2.4136E+01 | 7.1336E−04 | 1.4093E−04 | −4.8152E−06 | — |
| A14 = | −1.5979E+01 | −5.2728E−05 | −6.7278E−06 | 7.3221E−08 | — |
| A16 = | 4.3023E+00 | 1.5990E−06 | 1.2902E−07 | 2.8406E−10 | — |

6th Embodiment

Figure 16:
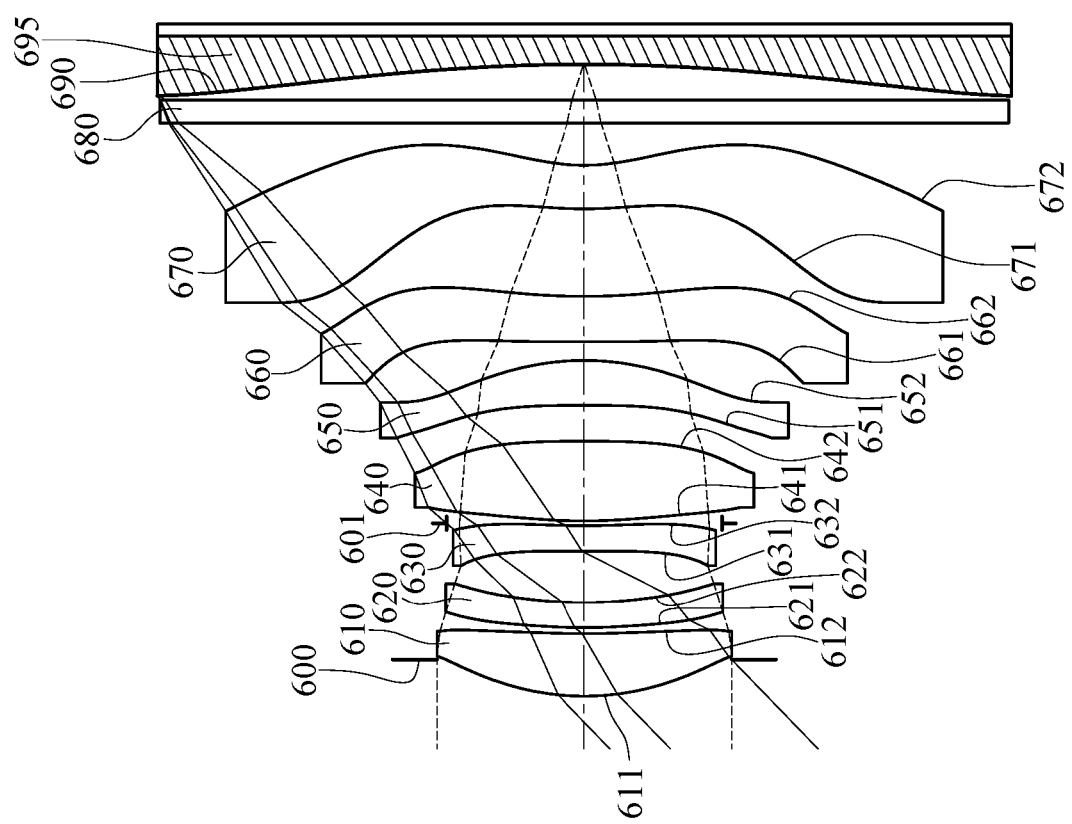
FIG. 16 is a schematic view of an image capturing unit according to the 6th embodiment of the present disclosure.
Figure 17:
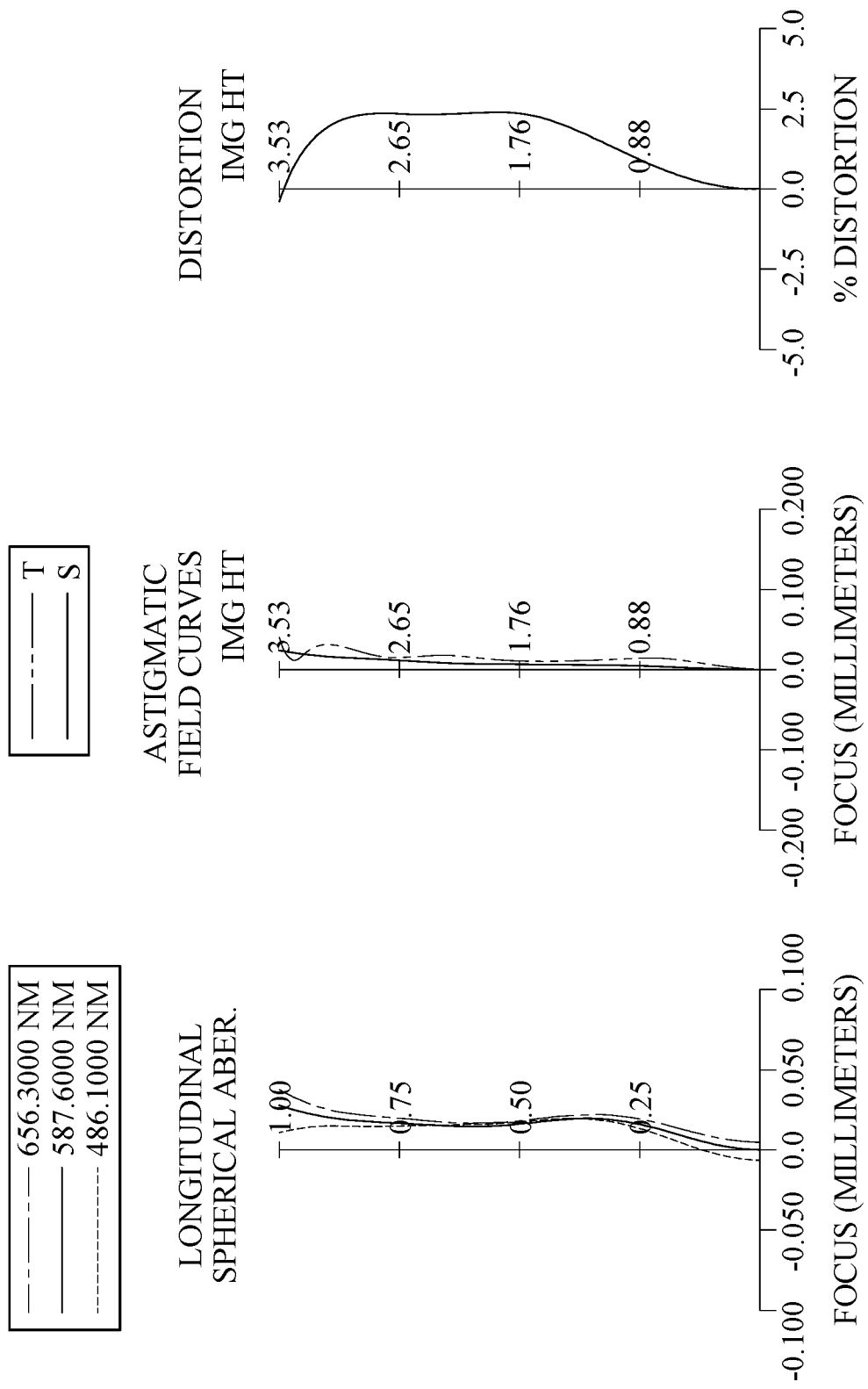
FIG. 17 shows spherical aberration curves, astigmatic field curves and a distortion curve of a first mode of the image capturing unit according to the 6th embodiment.
Figure 18:
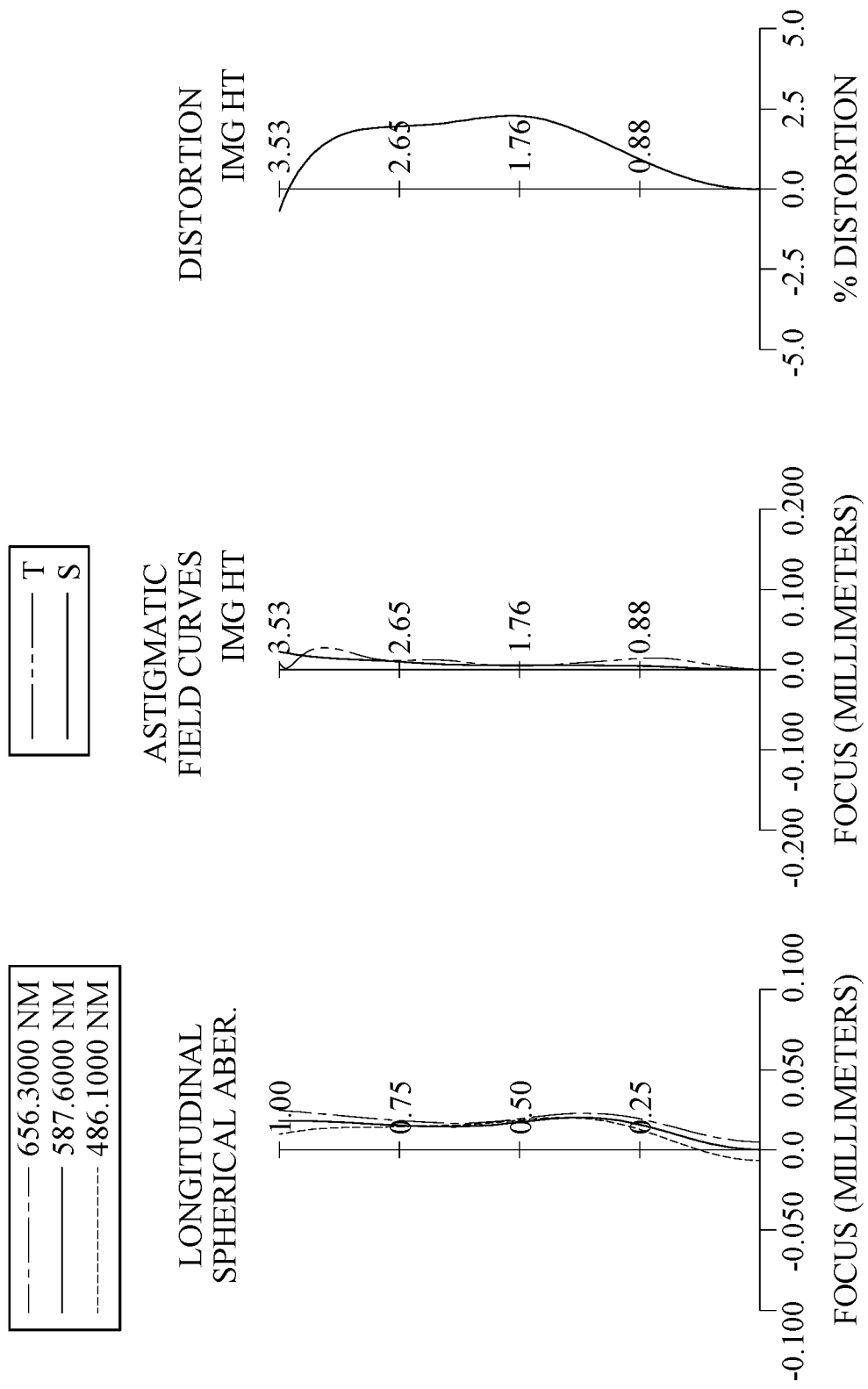
FIG. 18 shows spherical aberration curves, astigmatic field curves and a distortion curve of a second mode of the image capturing unit according to the 6th embodiment.

FIG. 16 is a schematic view of an image capturing unit according to the 6th embodiment of the present disclosure. FIG. 17 shows, in order from left to right, spherical aberration curves, astigmatic field curves and a distortion curve of a first mode of the image capturing unit according to the 6th embodiment. FIG. 18 shows, in order from left to right, spherical aberration curves, astigmatic field curves and a distortion curve of a second mode of the image capturing unit according to the 6th embodiment. In FIG. 16, the image capturing unit includes the photographing lens assembly (its reference numeral is omitted) of the present disclosure and an image sensor 695. The photographing lens assembly includes, in order from an object side to an image side, an aperture stop 600, a first lens element 610, a second lens element 620, a third lens element 630, a stop 601, a fourth lens element 640, a fifth lens element 650, a sixth lens element 660, a seventh lens element 670, a filter 680 and an image surface 690. The photographing lens assembly includes seven single and non-cemented lens elements (610, 620, 630, 640, 650, 660 and 670) with no additional lens element disposed between the first lens element 610 and the seventh lens element 670.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric.

The filter 680 is made of glass material and located between the seventh lens element 670 and the image surface 690, and will not affect the focal length of the photographing lens assembly.

The image surface 690 is concave in a paraxial region thereof, and the image surface 690 has at least one convex shape in an off-axis region thereof.

The image sensor 695 is disposed on or near the image surface 690 of the photographing lens assembly, and the image sensor 695 has at least one inflection point in an off-axis region thereof.

The detailed optical data of the 6th embodiment are shown in Table 16 and Table 17, and the aspheric surface data are shown in Table 18 below.

TABLE 16

1st Mode of 6th Embodiment
f = 3.86 mm, Fno = 1.58, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.302 | | | | |
| 2 | Lens 1 | 2.175 | (ASP) | 0.517 | Plastic | 1.545 | 56.0 | 5.60 |
| 3 | | 6.931 | (ASP) | 0.050 | | | | |
| 4 | Lens 2 | 4.316 | (ASP) | 0.210 | Plastic | 1.660 | 20.4 | −35.71 |
| 5 | | 3.578 | (ASP) | 0.427 | | | | |
| 6 | Lens 3 | 77.356 | (ASP) | 0.210 | Plastic | 1.660 | 20.4 | −9.63 |
| 7 | | 5.869 | (ASP) | 0.020 | | | | |
| 8 | Stop | Plano | | 0.020 | | | | |
| 9 | Lens 4 | 4.314 | (ASP) | 0.659 | Plastic | 1.544 | 55.9 | 6.64 |
| 10 | | −20.988 | (ASP) | 0.296 | | | | |
| 11 | Lens 5 | −33.428 | (ASP) | 0.372 | Plastic | 1.566 | 37.4 | 4.12 |
| 12 | | −2.189 | (ASP) | 0.154 | | | | |
| 13 | Lens 6 | −196.078 | (ASP) | 0.376 | Plastic | 1.660 | 20.4 | −8.58 |
| 14 | | 5.834 | (ASP) | 0.723 | | | | |
| 15 | Lens 7 | 3.261 | (ASP) | 0.360 | Plastic | 1.566 | 37.4 | −5.98 |
| 16 | | 1.595 | (ASP) | 0.350 | | | | |

TABLE 16-continued

1st Mode of 6th Embodiment
f = 3.86 mm, Fno = 1.58, HFOV = 44.0 deg.

| Surface # | | Curvature Radius | Thickness | Material | Index | Abbe # | Focal Length |
|---|---|---|---|---|---|---|---|
| 17 | Filter | Plano | 0.190 | Glass | 1.517 | 64.2 | — |
| 18 | | Plano | 0.295 | | | | |
| 19 | Image | −14.958 (ASP) | — | | | | |

Note:
Reference wavelength is 587.6 nm (d-line).
An effective radius of the stop 601 (Surface 8) is 1.140 mm.

The definitions of these parameters shown in the following table are the same as those stated in the 1st embodiment with corresponding values for the 6th embodiment, so an explanation in this regard will not be provided again.

Moreover, these parameters can be calculated from Table 16 and Table 18 as the following values and satisfy the following conditions:

| 1st Mode of 6th Embodiment | | | |
|---|---|---|---|
| f [mm] | 3.86 | |(10 × SAGI)/f| | 0.68 |
| Fno | 1.58 | |(10 × SAGI)/Ri| | 0.174 |
| HFOV [deg.] | 44.0 | |SAGI0.8/SAGI0.4| | 3.32 |
| tan(HFOV) | 0.97 | TL [mm] | 5.23 |
| Obj [mm] | Infinity | TL/ImgH | 1.48 |
| Imd [mm] | 0.295 | Nmax | 1.660 |
| CTmax [mm] | 0.66 | Ypl/f | 0.63 |
| CTmin [mm] | 0.21 | Ycl/f | — |
| |k| + Σ|Ai| | 7.79 | |YcLr/Ycl| | — |
| ΣAT/ΣCT | 0.63 | |(CRA − MRA)/CRA| | 0.13 |
| (R1 + R2)/(R1 − R2) | −1.91 | | 0.36 |
| (RLf + RLr)/(RLf − RLr) | 2.91 | |(CRH − MRH) × 10| [mm] | 0.01 |
| |f/Ri| | 0.26 | | 0.21 |
| Ri/RLr | −9.38 | |DIST| | 0.41% |
| BL/f | 0.22 | N | 7 |

The definitions of these parameters shown in the following table are the same as those stated in the 1st embodiment with corresponding values for the 6th embodiment, so an explanation in this regard will not be provided again.

Moreover, these parameters can be calculated from Table 17 and Table 18 as the following values and satisfy the following conditions:

| 2nd Mode of 6th Embodiment | | | |
|---|---|---|---|
| f [mm] | 3.86 | |(10 × SAGI)/f| | 0.68 |
| Fno | 1.70 | |(10 × SAGI)/Ri| | 0.174 |
| HFOV [deg.] | 43.6 | |SAGI0.8/SAGI0.4| | 3.32 |
| tan(HFOV) | 0.95 | TL [mm] | 5.29 |
| Obj [mm] | 250.00 | TL/ImgH | 1.50 |
| Imd [mm] | 0.353 | Nmax | 1.660 |
| CTmax [mm] | 0.66 | Ypl/f | 0.63 |
| CTmin [mm] | 0.21 | Ycl/f | — |
| |k| + Σ|Ai| | 7.79 | |YcLr/Ycl| | — |
| ΣAT/ΣCT | 0.63 | |(CRA − MRA)/CRA| | 0.13 |
| (R1 + R2)/(R1 − R2) | −1.91 | | 0.32 |
| (RLf + RLr)/(RLf − RLr) | 2.91 | |(CRH − MRH) × 10| [mm] | 0.02 |
| |f/Ri| | 0.26 | | 0.02 |
| Ri/RLr | −9.38 | |DIST| | 0.72% |
| BL/f | 0.23 | N | 7 |

TABLE 17

2nd Mode of 6th Embodiment
f = 3.86 mm, Fno = 1.70, HFOV = 43.6 deg.

| Surface # | | Curvature Radius | Thickness | Material | Index | Abbe # | Focal Length |
|---|---|---|---|---|---|---|---|
| 0 | Object | Plano | 250.000 | | | | |
| 1 | Ape. Stop | Plano | −0.302 | | | | |
| 2 | Lens 1 | 2.175 (ASP) | 0.517 | Plastic | 1.545 | 56.0 | 5.60 |
| 3 | | 6.931 (ASP) | 0.050 | | | | |
| 4 | Lens 2 | 4.316 (ASP) | 0.210 | Plastic | 1.660 | 20.4 | −35.71 |
| 5 | | 3.578 (ASP) | 0.427 | | | | |
| 6 | Lens 3 | 77.356 (ASP) | 0.210 | Plastic | 1.660 | 20.4 | −9.63 |
| 7 | | 5.869 (ASP) | 0.020 | | | | |
| 8 | Stop | Plano | 0.020 | | | | |
| 9 | Lens 4 | 4.314 (ASP) | 0.659 | Plastic | 1.544 | 55.9 | 6.64 |
| 10 | | −20.988 (ASP) | 0.296 | | | | |
| 11 | Lens 5 | −33.428 (ASP) | 0.372 | Plastic | 1.566 | 37.4 | 4.12 |
| 12 | | −2.189 (ASP) | 0.154 | | | | |
| 13 | Lens 6 | −196.078 (ASP) | 0.376 | Plastic | 1.660 | 20.4 | −8.58 |
| 14 | | 5.834 (ASP) | 0.723 | | | | |
| 15 | Lens 7 | 3.261 (ASP) | 0.360 | Plastic | 1.566 | 37.4 | −5.98 |
| 16 | | 1.595 (ASP) | 0.350 | | | | |
| 17 | Filter | Plano | 0.190 | Glass | 1.517 | 64.2 | — |
| 18 | | Plano | 0.353 | | | | |
| 19 | Image | −14.958 (ASP) | — | | | | |

Note:
Reference wavelength is 587.6 nm (d-line).
An effective radius of the stop 601 (Surface 8) is 1.140 mm.

In the 6th embodiment, the equation of the aspheric surface profiles of the aforementioned lens elements is the same as the equation of the 1st embodiment.

TABLE 18

Aspheric Coefficients

| Surface # | 2 | 3 | 4 | 5 | 6 |
|---|---|---|---|---|---|
| k = | 1.1830E−01 | −7.2849E+01 | −1.9741E+01 | −2.6419E+01 | −6.0311E+01 |
| A4 = | −4.2512E−03 | −1.1161E−01 | −1.3359E−01 | 1.7111E−02 | −1.0548E−01 |
| A6 = | −1.0775E−02 | 2.0001E−01 | 2.5893E−01 | −9.8949E−03 | −2.3035E−02 |
| A8 = | 2.1969E−02 | −1.8161E−01 | −1.9949E−01 | 1.2779E−01 | 1.1163E−01 |
| A10 = | −3.5681E−02 | 8.9575E−02 | 8.1866E−02 | −1.9149E−01 | −2.1489E−01 |
| A12 = | 2.5386E−02 | −2.0661E−02 | −8.3432E−03 | 1.0634E−01 | 1.7338E−01 |
| A14 = | −7.9276E−03 | −3.7738E−03 | −9.6351E−03 | −7.6011E−03 | −5.6094E−02 |
| A16 = | 1.0571E−04 | 1.9456E−03 | 3.9716E−03 | −9.5809E−03 | — |

| Surface # | 7 | 9 | 10 | 11 | 12 |
|---|---|---|---|---|---|
| k = | −4.4509E+01 | −7.6780E+01 | −5.1486E+01 | 2.7649E+01 | −9.4312E−01 |
| A4 = | −1.3854E−01 | −1.1490E−02 | −1.0170E−01 | −1.4274E−01 | 9.5721E−03 |
| A6 = | 1.3353E−01 | 3.6300E−02 | 6.6281E−02 | 1.0480E−01 | −2.3782E−03 |
| A8 = | −1.4353E−01 | −4.5236E−02 | −6.6738E−02 | −7.5469E−02 | −3.9465E−03 |
| A10 = | 8.0040E−02 | 2.2627E−02 | 4.0567E−02 | 3.9546E−02 | 1.5118E−02 |
| A12 = | −1.7662E−02 | −3.1791E−03 | −1.5287E−02 | −9.5390E−03 | −6.9018E−03 |
| A14 = | — | — | 3.1538E−03 | 6.9555E−04 | 1.0362E−03 |
| A16 = | — | — | — | — | −4.1866E−05 |

| Surface # | 13 | 14 | 15 | 16 | 19 |
|---|---|---|---|---|---|
| k = | −9.0000E+01 | 4.7326E+00 | −2.3467E+01 | −7.0312E+00 | −7.7863E+00 |
| A4 = | 9.8440E−01 | 6.9028E−03 | −1.7299E−01 | −9.6660E−02 | 7.1628E−04 |
| A6 = | −4.7106E+00 | −4.8374E−02 | 7.0694E−02 | 3.9992E−02 | −2.0454E−05 |
| A8 = | 8.9563E+00 | 2.5205E−02 | −2.8081E−02 | −1.2932E−02 | 1.5484E−07 |
| A10 = | −1.0101E+01 | −7.5244E−03 | 8.2636E−03 | 2.7415E−03 | 3.2919E−07 |
| A12 = | 5.2214E+00 | 1.1193E−03 | −1.3581E−03 | −3.3940E−04 | −1.3808E−08 |
| A14 = | −7.7218E−01 | −5.5111E−05 | 1.1269E−04 | 2.2177E−05 | — |
| A16 = | — | −1.2793E−06 | −3.7261E−06 | −5.9111E−07 | — |

7th Embodiment

Figure 19:
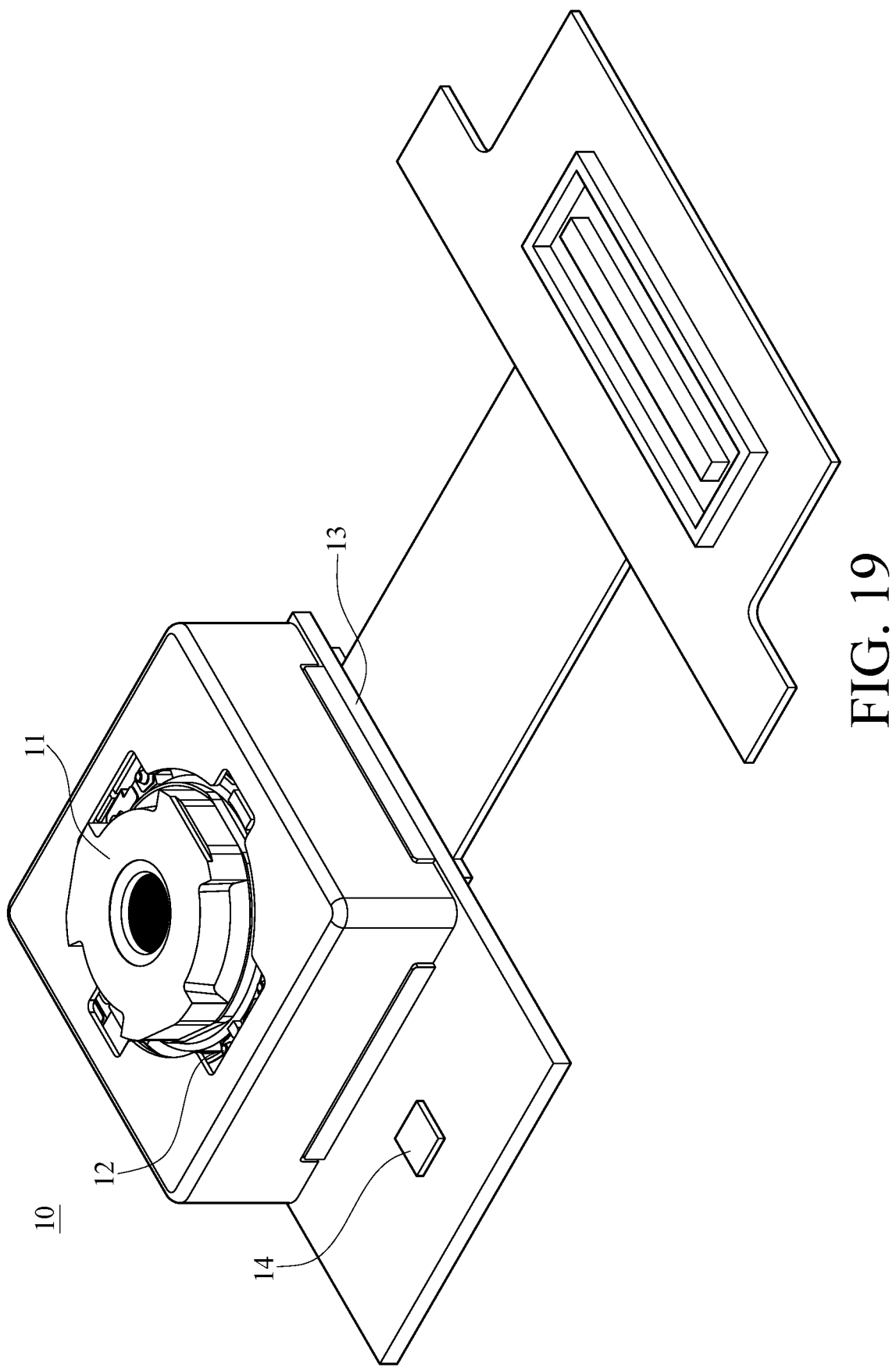
FIG. 19 is a perspective view of an image capturing unit according to the 7th embodiment of the present disclosure.

FIG. 19 is a perspective view of an image capturing unit according to the 7th embodiment of the present disclosure. In this embodiment, an image capturing unit 10 is a camera module including a lens unit 11, a driving device 12, an image sensor 13 and an image stabilizer 14. The lens unit 11 includes the photographing lens assembly disclosed in the 1st embodiment, a barrel and a holder member (their reference numerals are omitted) for holding the photographing lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

8th Embodiment

Figure 20:
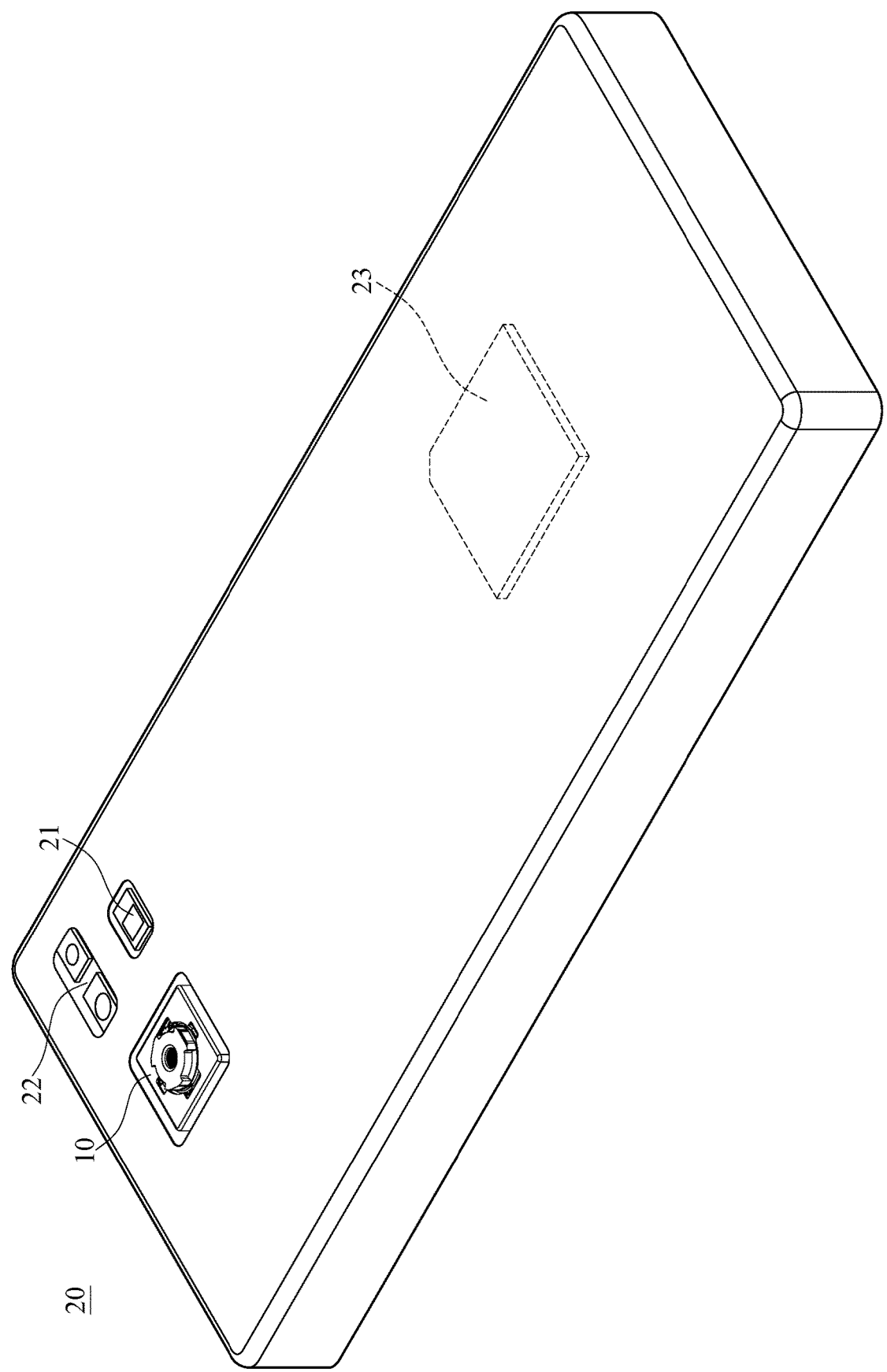
FIG. 20 is one perspective view of an electronic device according to the 8th embodiment of the present disclosure.
Figure 21:
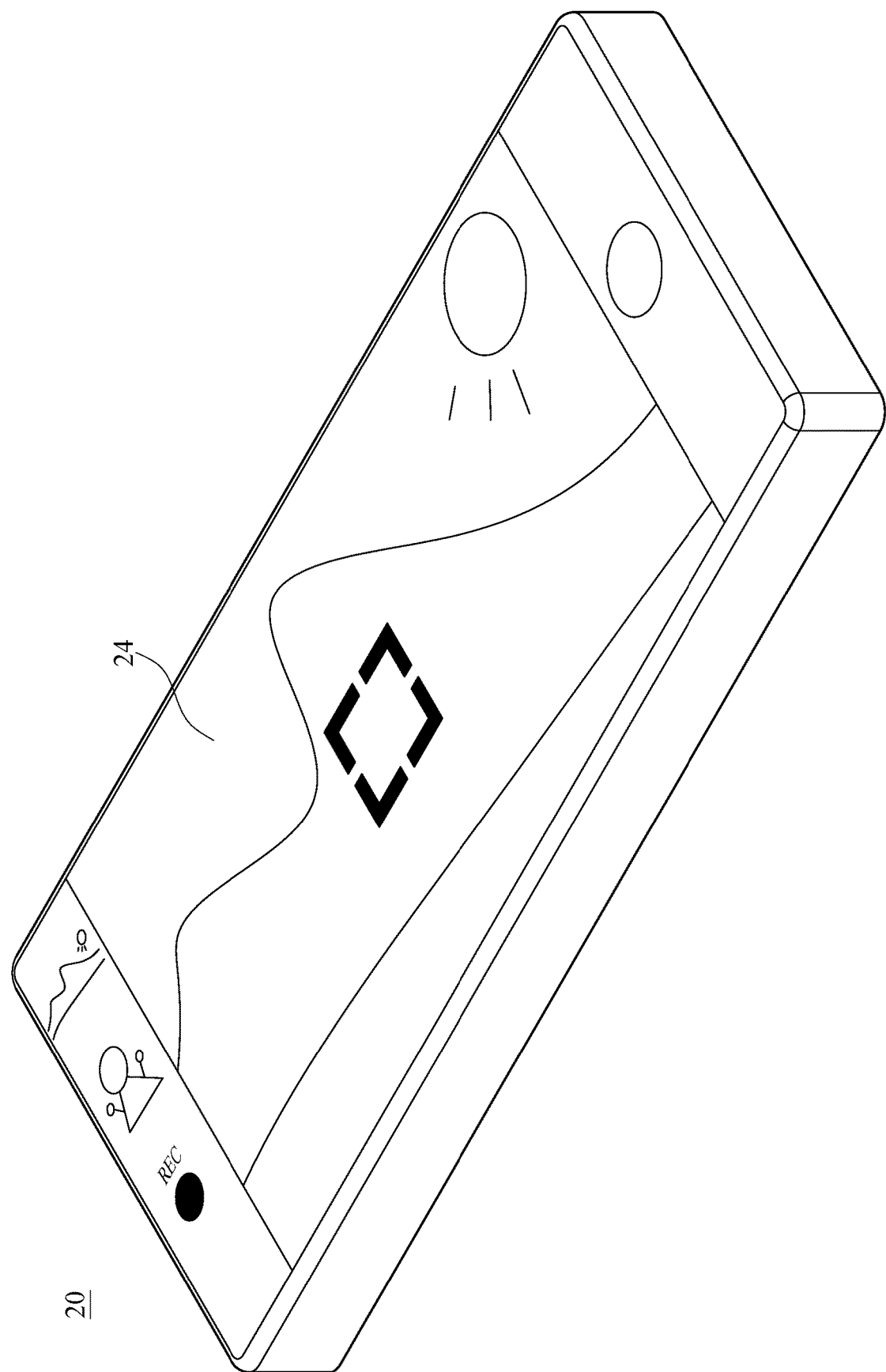
FIG. 21 is another perspective view of the electronic device in FIG. 20.
Figure 22:
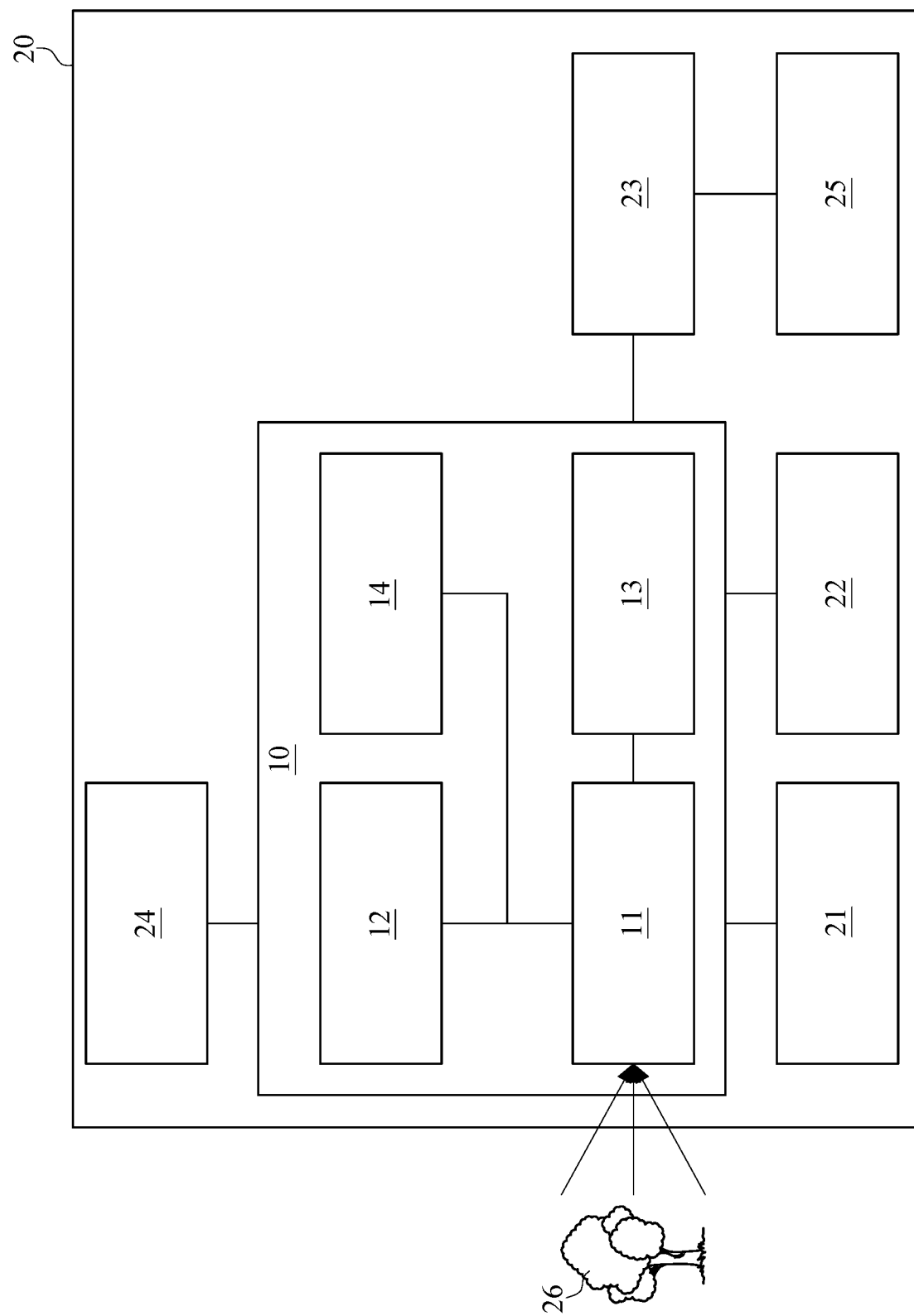
FIG. 22 is a block diagram of the electronic device in FIG. 20.

FIG. 20 is one perspective view of an electronic device according to the 8th embodiment of the present disclosure. FIG. 21 is another perspective view of the electronic device in FIG. 20. FIG. 22 is a block diagram of the electronic device in FIG. 20. In this embodiment, an electronic device 20 is a smartphone including the image capturing unit 10 disclosed in the 7th embodiment, a flash module 21, a focus assist module 22, an image signal processor 23, a user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user captures images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve the image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising, in order from an object side to an image side:
   a plurality of lens elements, each of the plurality of lens elements having an object-side surface facing toward the object side and an image-side surface facing toward the image side, and each of the plurality of lens elements being a single and non-cemented lens element; and
   an image surface;
   wherein the plurality of lens elements comprises a first lens element and an image-side lens element, the first lens element is closest to the object side among the plurality of lens elements, the image-side lens element is closest to the image surface among the plurality of lens elements, the first lens element has positive refractive power, the image-side lens element has negative refractive power, a sum of axial distances between every adjacent lens elements of the photographing lens assembly is $\Sigma AT$, a sum of central thicknesses of the plurality of lens elements of the photographing lens assembly is $\Sigma CT$, a displacement in parallel with an optical axis between a profile point on the image surface and an axial vertex of the image surface is X, a vertical distance between the profile point on the image surface and the optical axis is Y, a conic coefficient of the image surface is k, a curvature radius of the image surface at the profile point is R, an i-th aspheric coefficient of the image surface is Ai, a curvature radius of the object-side surface of the first lens element is R1, a curvature radius of the image-side surface of the first lens element is R2, a curvature radius of the object-side surface of the image-side lens element is RLf, a curvature radius of the image-side surface of the image-side lens element is RLr, and the following conditions are satisfied:

$0.10 < \Sigma AT/\Sigma CT < 3.50;$ $X = (Y^2/R)/\{1+\mathrm{sqrt}[1-(1+k)\times(Y/R)^2]\} + \Sigma(Ai)\times(Y^i);$ $0 < |k| + \Sigma |Ai|;$ $-3.50 < (R1+R2)/(R1-R2) < 0;$ and $0 < (RLf+RLr)/(RLf-RLr) < 3.50.$ 2. The photographing lens assembly of claim 1, wherein the image surface is concave in a paraxial region thereof and faces toward the object side, and the image surface has at least one convex shape in an off-axis region thereof.

3. The photographing lens assembly of claim 1, wherein the plurality of lens elements further comprises a second lens element, the second lens element is adjacent and located on the image side of the first lens element with no other element having refractive power therebetween, and the second lens element has negative refractive power.

4. The photographing lens assembly of claim 1, wherein a displacement in parallel with the optical axis from the axial vertex of the image surface to a maximum image height position on the image surface is SAGI, a focal length of the photographing lens assembly is f, and the following condition is satisfied:

$0.03 < |(10\times SAGI)/f| < 1.4.$

5. The photographing lens assembly of claim 1, wherein a displacement in parallel with the optical axis from the axial vertex of the image surface to a position of 0.8 times a maximum image height on the image surface is SAGI0.8, a displacement in parallel with the optical axis from the axial vertex of the image surface to a position of 0.4 times the maximum image height on the image surface is SAGI0.4, and the following condition is satisfied:

$0 < |SAGI0.8/SAGI0.4| < 5.0.$

6. The photographing lens assembly of claim 1, wherein a focal length of the photographing lens assembly is f, a curvature radius of the image surface in a paraxial region thereof is Ri, and the following condition is satisfied:

$0.01 < |f/Ri| < 0.50.$

7. The photographing lens assembly of claim 1, wherein a vertical distance between a point at a maximum image height position on the image surface in which a chief ray is incident and the optical axis is CRH, a vertical distance between a point at the maximum image height position on the image surface in which a marginal ray on a meridional plane is incident and the optical axis is MRH, and the following condition is satisfied:

$|(CRH-MRH)\times 10| 0.50$ [mm].

8. The photographing lens assembly of claim 1, wherein an angle between a chief ray at a maximum image height position on the image surface and a normal line of the image surface in a paraxial region thereof is CRA, an angle between a marginal ray on a meridional plane at the maximum image height position on the image surface and the normal line of the image surface in the paraxial region thereof is MRA, and the following condition is satisfied:

$0.01 < |(CRA-MRA)/CRA| < 0.80.$

9. The photographing lens assembly of claim 1, wherein half of a maximum field of view of the photographing lens assembly is HFOV, an f-number of the photographing lens assembly is Fno, and the following conditions are satisfied:

$0.65 < \tan(HFOV) < 1.80$; and $1.0 < Fno < 2.20$.

10. The photographing lens assembly of claim 1, wherein a distortion in a maximum image height position of the photographing lens assembly is DIST, and the following condition is satisfied:

$|DIST| < 2.5\%$.

11. The photographing lens assembly of claim 1, wherein a maximum value among all central thicknesses of the plurality of lens elements of the photographing lens assembly is CTmax, a minimum value among all central thicknesses of the plurality of lens elements of the photographing lens assembly is CTmin, and the following conditions are satisfied:

$0.60 \text{ [mm]} \leq CTmax < 1.50 \text{ [mm]}$; and $0.21 \text{ [mm]} \leq CTmin < 0.40 \text{ [mm]}$.

12. The photographing lens assembly of claim 1, wherein a number of the plurality of lens elements of the photographing lens assembly is N, and the following condition is satisfied:

$4 \leq N \leq 8$.

13. The photographing lens assembly of claim 1, wherein the plurality of lens elements are all made of plastic material, at least one of the plurality of lens elements has an Abbe number larger or equal to 19.5 and smaller than 22.0, a maximum value among all refractive indices of the plurality of lens elements of the photographing lens assembly is Nmax, and the following condition is satisfied:

$1.660 \leq Nmax < 1.70$.

14. The photographing lens assembly of claim 1, further comprising a mechanical component located between an imaged object and the image surface, wherein the mechanical component is configured to change an area for incident light to enter the photographing lens assembly.

15. An image capturing unit, comprising:
the photographing lens assembly of claim 1; and
an image sensor disposed on the image surface of the photographing lens assembly, the image sensor having an aspheric surface facing toward the image surface.

16. The image capturing unit of claim 15, wherein a vertical distance between a non-axial critical point on the image-side surface of the image-side lens element and the optical axis is YcLr, a vertical distance between a non-axial critical point on the surface of the image sensor and the optical axis is YcI, and the following condition is satisfied:

$|YcLr/YcI| < 1.0$.

17. An electronic device, comprising:
the image capturing unit of claim 15.

18. An image capturing unit comprising, in order from an object side to an image side:
a photographing lens assembly comprising, in order from the object side to the image side, a plurality of lens elements and an aspheric image surface, and each of the plurality of lens elements having an object-side surface facing toward the object side and an image-side surface facing toward the image side; and an aspheric image sensor disposed on the aspheric image surface, and a curvature of a surface of the aspheric image sensor varying in an effective photosensitive area thereof;
wherein the plurality of lens elements comprises a first lens element and an image-side lens element, the first lens element is closest to the object side among the plurality of lens elements, the image-side lens element is closest to the aspheric image surface among the plurality of lens elements, the first lens element has positive refractive power, the image-side lens element has negative refractive power, a maximum value among all central thicknesses of the plurality of lens elements of the photographing lens assembly is CTmax, a minimum value among all central thicknesses of the plurality of lens elements of the photographing lens assembly is CTmin, a curvature radius of the object-side surface of the first lens element is R1, a curvature radius of the image-side surface of the first lens element is R2, a curvature radius of the object-side surface of the image-side lens element is RLf, a curvature radius of the image-side surface of the image-side lens element is RLr, and the following conditions are satisfied:

$0.60 \text{ [mm]} \leq CTmax < 2.0 \text{ [mm]}$;

$0.21 \text{ [mm]} \leq CTmin < 0.50 \text{ [mm]}$;

$-3.50 < (R1+R2)/(R1-R2) < 0$; and $0 < (RLf+RLr)/(RLf-RLr) < 3.50$.

19. The image capturing unit of claim 18, wherein the object-side surfaces and the image-side surfaces of the plurality of lens elements of the photographing lens assembly are all aspheric, an axial distance between the object-side surface of the first lens element and the aspheric image surface is TL, a maximum image height of the photographing lens assembly is ImgH, and the following condition is satisfied:

$0.30 < TL/ImgH < 1.80$.

20. The image capturing unit of claim 18, wherein a number of the plurality of lens elements of the photographing lens assembly is N, an axial distance between the image-side surface of the image-side lens element and the aspheric image surface is BL, a focal length of the photographing lens assembly is f, and the following conditions are satisfied:

$3 \leq N \leq 8$; and $0.10 < BL/f < 0.50$.

21. The image capturing unit of claim 18, wherein the plurality of lens elements are all made of plastic, at least one of the plurality of lens elements has an Abbe number larger or equal to 19.5 and smaller than 22.0, a maximum value among all refractive indices of the plurality of lens elements of the photographing lens assembly is Nmax, and the following condition is satisfied:

$1.660 \leq Nmax < 1.70$.

22. The image capturing unit of claim 18, wherein the surface of the aspheric image sensor has at least one critical point in an off-axis region thereof, a vertical distance between the at least one critical point and an optical axis is YcI, a focal length of the photographing lens assembly is f, and the following condition is satisfied:

$0.1 < YcI/f < 2.0$.

23. The image capturing unit of claim 22, wherein a curvature radius of the aspheric image surface in a paraxial region thereof is Ri, the curvature radius of the image-side surface of the image-side lens element is RLr, and the following condition is satisfied:

−100<Ri/RLr<0.

24. An image capturing unit comprising, in order from an object side to an image side:
a photographing lens assembly comprising, in order from the object side to the image side, a plurality of lens elements and an aspheric image surface, and each of the plurality of lens elements having an object-side surface facing toward the object side and an image-side surface facing toward the image side; and
an aspheric image sensor disposed on the aspheric image surface, and a curvature of a surface of the aspheric image sensor varying in an effective photosensitive area thereof;
wherein the plurality of lens elements comprises a first lens element a second lens element and an image-side lens element, the first lens element is closest to the object side among the plurality of lens elements, the image-side lens element is closest to the aspheric image surface among the plurality of lens elements, the second lens element is adjacent and located on the image side of the first lens element with no other element having refractive power therebetween, the first lens element has positive refractive power, the second lens element has negative refractive power, the image-side lens element has negative refractive power, an axial distance between the object-side surface of the first lens element and the aspheric image surface is TL, a curvature radius of the object-side surface of the first lens element is R1, a curvature radius of the image-side surface of the first lens element is R2, a curvature radius of the object-side surface of the image-side lens element is RLf, a curvature radius of the image-side surface of the image-side lens element is RLr, and the following conditions are satisfied:

4.29 [mm]≤TL<20[mm];

−3.50<(R1+R2)/(R1-R2)<0; and

0<(RLf+RLr)/(RLf-RLr)<3.50.

25. The image capturing unit of claim 24, wherein the axial distance between the object-side surface of the first lens element and the aspheric image surface is TL, and the following condition is satisfied:

4.29[mm]≤TL <15[mm].

26. The image capturing unit of claim 24, wherein a displacement in parallel with an optical axis from an axial vertex of the aspheric image surface to a maximum image height position on the aspheric image surface is SAGI, a curvature radius of the aspheric image surface in a paraxial region thereof is Ri, and the following condition is satisfied:

0<|(10×SAGI)/Ri|<1.0.

27. The image capturing unit of claim 24, wherein the surface of the aspheric image sensor has at least one inflection point in an off-axis region thereof, a vertical distance between the at least one inflection point and an optical axis is YpI, a focal length of the photographing lens assembly is f, and the following condition is satisfied:

0.1<YpI/f<2.0.

28. The image capturing unit of claim 27, wherein a vertical distance between a non-axial critical point on the image-side surface of the image-side lens element and the optical axis is YcLr, a vertical distance between a non-axial critical point on the surface of the aspheric image sensor and the optical axis is YcI, and the following condition is satisfied:

|YcLr/YcI|<1.0.

* * * * *